United States Patent [19]
Lo et al.

[11] Patent Number: 5,276,790
[45] Date of Patent: Jan. 4, 1994

[54] FAST VERTICAL SCAN-CONVERSION AND FILLING METHOD AND APPARATUS FOR OUTLINE FONT CHARACTER GENERATION IN DOT MATRIX DEVICES

[75] Inventors: Jim C. K. Lo; James C. Y. Lung, both of San Jose, Calif.

[73] Assignee: Destiny Technology Corporation, Milpitas, Calif.

[21] Appl. No.: 730,181

[22] Filed: Jul. 12, 1991

[51] Int. Cl.[5] .............................................. G06F 15/62
[52] U.S. Cl. .................................... 395/142; 395/141; 395/150
[58] Field of Search ....................... 395/108, 141–143, 144, 150, 151

[56] References Cited

U.S. PATENT DOCUMENTS

| | | | |
|---|---|---|---|
| 4,626,838 | 12/1986 | Tsujioka et al. | 340/744 |
| 4,745,575 | 5/1988 | Hawes | 364/900 |
| 4,759,965 | 7/1988 | Liang et al. | 395/141 X |
| 4,855,935 | 8/1989 | Lien et al. | 364/521 |
| 4,937,761 | 6/1990 | Hassett | 364/518 |
| 4,949,281 | 8/1990 | Hillenbrand et al. | 395/150 X |

OTHER PUBLICATIONS

Bresenham, J. E., "Algorithm for Computer Control of a Digital Plotter" (*IBM Systems Journal*, vol. 4, No. 1, 1965; pp. 25–30).

Bresenham, J. E., "A linear Algorithm for Incremental Digital Display of Circular Arcs" (*Communication of the ACM*, 20(2), Feb. 1977, pp. 100–106; see also *Fundamentals of Interactive Computer Graphics*, by J. D. Foley and A. VanDam, Addison-Wesley Publishing Co., 1982, pp. 433–436, 461).

Hersch, R. D.; "Vertical Scan-Conversion for Filling Purposes" (*Proceeding Computer Graphics International 88*, Geneva, May 24–27 (D. Thalmann, ed.), Springer Verlag, 1988).

*Primary Examiner*—Gary V. Harkcom
*Assistant Examiner*—Almis Jankus
*Attorney, Agent, or Firm*—Claude A. S. Hamrick

[57] ABSTRACT

A fast vertical scan-conversion and filling method and apparatus for outline font character generation in dot matrix devices including a normalized polysegment generation engine for converting spline data to normalized polysegment data, a vertical scan conversion engine comprised of a decision table transitioner (DT) unit for identifying the location of a transition pixel relative to each polysegment or indicating that an identification cannot be made, intersection transition calculating unit (IT) for calculating the position of a transition pixel relative to each polysegment, and a transition pixel coordinate generating unit responsive to the normalized polysegment data and input received from the DT and IT units and operative to generate signals corresponding to the X and Y coordinates of each transition pixel, and a parity filling engine responsive to the x and y coordinate segment and operative to generate bit mapped character image data for use in driving a bit map print or display device.

8 Claims, 31 Drawing Sheets

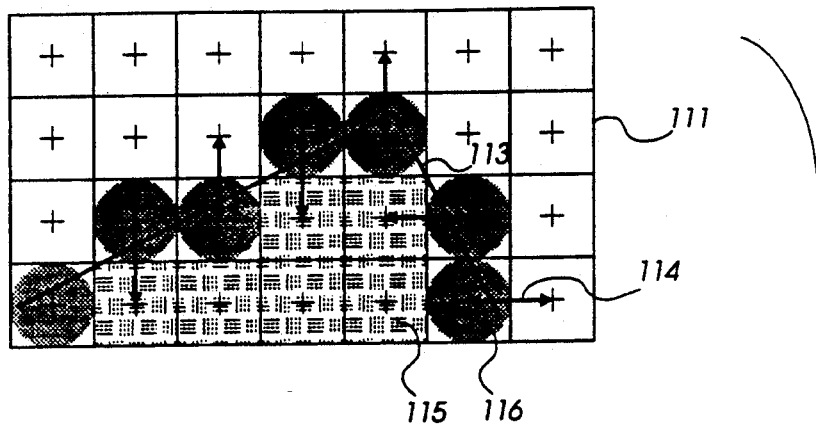
Bresenham Method
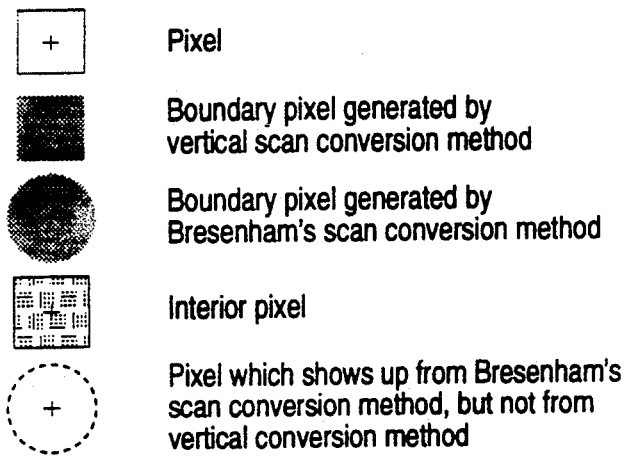
| | |
|---|---|
| + | Pixel |
| ■ | Boundary pixel generated by vertical scan conversion method |
| ● | Boundary pixel generated by Bresenham's scan conversion method |
| ▦ | Interior pixel |
| (+) | Pixel which shows up from Bresenham's scan conversion method, but not from vertical conversion method |
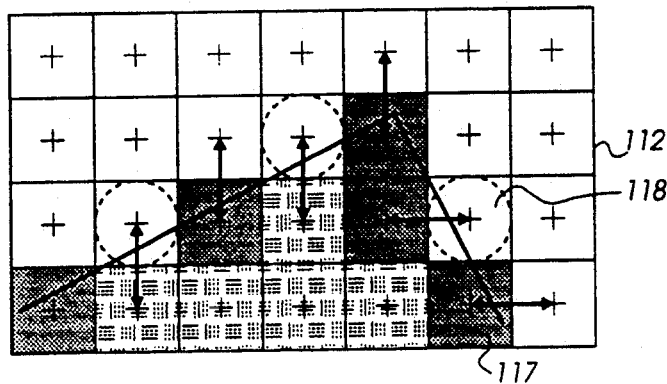
Vertical Scan Conversion Method
Fig. 2a

| Vertical Scan Conversion Method — 143 | vs | Bresenham's Scan Conversion Method — 144 |
|---|---|---|
| 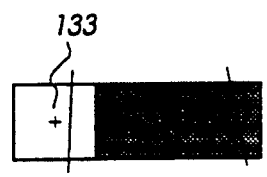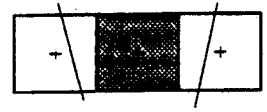 | | 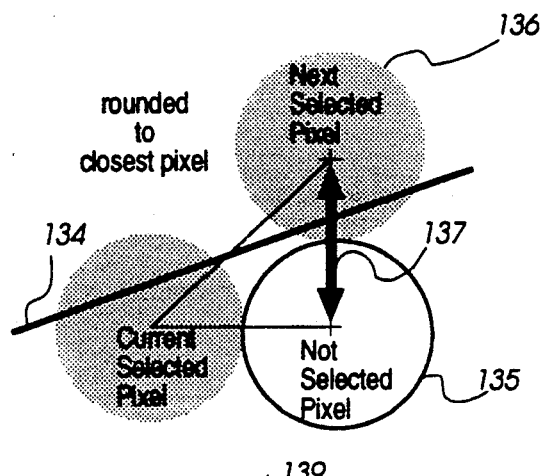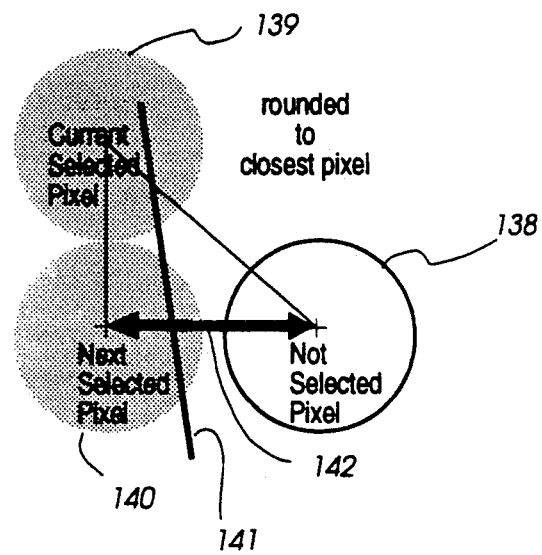 |
Fig. 2b

| | |
|---|---|
| [x,y] | Pixel address (at lower left corner) |
| y+0.5 | Pixel center line (or called "Scan Line" interchangeably) |
| [x+0.5,y+0.5] | Pixel center |

Pixel orientation (in X and Y axes)

Pixel boundary and center

Pixel "quadrant" definition

Quadrant boundary definition

Definition of NX direction:

Types of decision table entries

[1] Meaningless
(e.g. decision table entry 1b)

[2] Non-deterministic
(e.g. decision table entry 6d)

[3] No TX at all
   (e.g. decision table entry 6h)

[4] TX is CX
   (e.g. decision table entry 3f)

[5] TX is (CX+1)
 (e.g. decision table entry 12i)

[6] TX is NX
 (e.g. decision table entry 9l)

Mnemonics

/
?
0
=C
>C
=N
>N

Decision Types

Meaningless
Non-deterministic
No TX
TX=CX
TX=CX+1
TX=NX
TX=NX+1

Y index →

|   | 1 | 2 | 3 | 4 | 5 | 6 | 7 | 8 | 9 | 10 | 11 | 12 |   |
|---|---|---|---|---|---|---|---|---|---|----|----|----|---|
| a | ? | / | >N | >N | =N | ? | ? | >N | =N | =N | / | ? |
| b | / | / | / | / | / | / | / | / | / | / | / | / |
| c | 0 | / | 0 | 0 | 0 | 0 | 0 | 0 | 0 | 0 | / | 0 |
| d | =C | / | =C | ? | =C | ? | ? | >C | ? | >C | / | >C |
| e | 0 | / | 0 | 0 | 0 | 0 | 0 | 0 | 0 | 0 | / | 0 |
| f | ? | / | =C | ? | =C | ? | ? | >C | ? | >C | / | ? |
| g | ? | / | =C | ? | =C | ? | ? | >C | ? | >C | / | ? |
| h | 0 | / | 0 | 0 | 0 | 0 | 0 | 0 | 0 | 0 | / | 0 |
| i | =C | / | =C | ? | =C | ? | ? | >C | ? | >C | / | >C |
| j | 0 | / | 0 | 0 | 0 | 0 | 0 | 0 | 0 | 0 | / | 0 |
| k | / | / | / | / | / | / | / | / | / | / | / | / |
| l | ? | / | >N | >N | =N | ? | ? | >N | =N | =N | / | ? |

430

X index →

Fig. 15

Keys:

❖  Polysegment endpoints (i.e., CP: the current departure point; NP: the next arrival point)

<X index, Y index>  Decision table index of the 12-by-12 combination chart, associated with each NP CP quadrant → NX direction: NP quadrant CP quadrants (i.e. c1, c2, c3, c4) mapped into NP quadrants (i.e. n1, n2, n3, n4) of NX

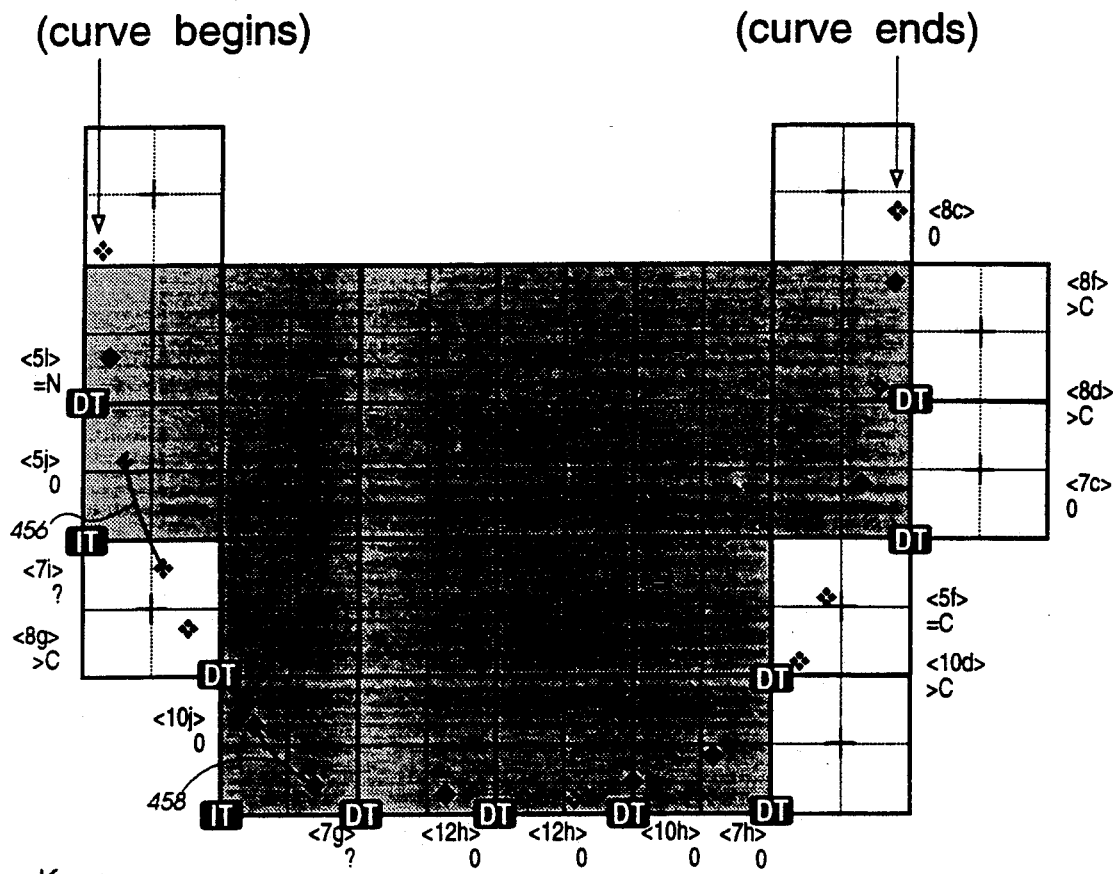

Keys:

♦      Polysegment endpoints (i.e., CP: the current departure point; NP: the next arrival point)

<X index, Y index> CONTENT      Decision table index of the 12-by-12 combination chart, followed by its content an the location

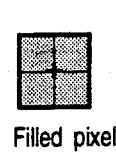

Filled pixel

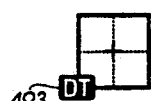

493 Transition pixel determined by the decision table, in other words, the DT unit.

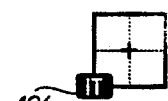

496 Transition pixel which can not be determined by the decision table; it is calculated by the IT unit.

Fig. 17

| 16-bit word | | pixel coordinate value | | | pixel coordinate |
| --- | --- | --- | --- | --- | --- |
| upper 12 bits | lower 4 bits | sign | integer | fraction | value representation |
| 000000000000 | 0000 | | 0 | 0 | 0x0 |
| 000000000000 | 0001 | | 0 | 1/16 | 0x1 |
| 000000000000 | 1000 | | 0 | 1/2 | 0x8 |
| 000000000000 | 1111 | | 0 | 15/16 | 0x15 |
| 000000000001 | 0000 | | 1 | 0 | 1x0 |
| 000000000001 | 1000 | | 1 | 1/2 | 1x8 |
| 011111111111 | 1111 | | 2047 | 15/16 | 2047x15 |
| 111111111111 | 1111 | - | 0 | 1/16 | -0x1 |
| 111111111111 | 1000 | - | 0 | 1/2 | -0x8 |
| 100000000000 | 0001 | - | 2047 | 15/16 | -2047x15 |
| 100000000000 | 0000 | - | 2048 | 0 | -2048x0 |

Subpixel grid representation

Outline Font Character Generation

| | cbx=1<br>dx4=1<br>NPxF3=0<br>CPxF3=1 | cbx=1<br>dx4=1<br>NPxF3=1<br>CPxF3=1 | cbx=0<br>dx4=1<br>NPxF3=0<br>CPxF3=1 | cbx=0<br>dx4=?<br>NPxF3=1<br>CPxF3=1 | cbx=1<br>dx4=0<br>NPxF3=0<br>CPxF3=1 | cbx=1<br>dx4=0<br>NPxF3=1<br>CPxF3=1 | | |
|---|---|---|---|---|---|---|---|---|
| | ↓ | ↓ | ↓ | ↓ | ↓ | ↓ | | |
| a | ? / | >N >N | =N ? | ? >N | =N =N | / ? | | cby=1, dy4=0, NPyF3=1, CPyF3=1 |
| b | / / | / / | / / | / / | / / | / / | | cby=1, dy4=0, NPyF3=1, CPyF3=0 |
| c | 0 / | 0 0 | 0 0 | 0 0 | 0 0 | / 0 | | cby=1, dy4=0, NPyF3=0, CPyF3=1 |
| d | =C / | =C ? | =C ? | ? >C | ? >C | / >C | | cby=1, dy4=0, NPyF3=0, CPyF3=0 |
| e | 0 / | 0 0 | 0 0 | 0 0 | 0 0 | / 0 | | cby=0, dy4=?, NPyF3=1, CPyF3=1 |
| f | ? / | =C ? | =C ? | ? >C | ? >C | / ? | | cby=0, dy4=0, NPyF3=1, CPyF3=0 |
| g | ? / | =C ? | =C ? | ? >C | ? >C | / ? | | cby=0, dy4=1, NPyF3=0, CPyF3=1 |
| h | 0 / | 0 0 | 0 0 | 0 0 | 0 0 | / 0 | | cby=0, dy4=?, NPyF3=0, CPyF3=0 |
| i | =C / | =C ? | =C ? | ? >C | ? >C | / >C | | cby=1, dy4=1, NPyF3=1, CPyF3=1 |
| j | 0 / | 0 0 | 0 0 | 0 0 | 0 0 | / 0 | | cby=1, dy4=1, NPyF3=1, CPyF3=0 |
| k | / / | / / | / / | / / | / / | / / | | cby=1, dy4=1, NPyF3=0, CPyF3=1 |
| l | ? / | >N >N | =N ? | ? >N | =N =N | / ? | | cby=1, dy4=1, NPyF3=0, CPyF3=0 |
| | 1 2 | 3 4 | 5 6 | 7 8 | 9 10 | 11 12 | | |
| | ↑ | ↑ | ↑ | ↑ | ↑ | ↑ | | |
| | cbx=1<br>dx4=1<br>NPxF3=0<br>CPxF3=0 | cbx=1<br>dx4=1<br>NPxF3=1<br>CPxF3=0 | cbx=0<br>dx4=?<br>NPxF3=0<br>CPxF3=0 | cbx=0<br>dx4=0<br>NPxF3=1<br>CPxF3=0 | cbx=1<br>dx4=0<br>NPxF3=0<br>CPxF3=0 | cbx=1<br>dx4=0<br>NPxF3=1<br>CPxF3=0 | | |

Truth Table DT unit

Fig. 22

DT unit

IT unit

Output unit

FAST VERTICAL SCAN-CONVERSION AND FILLING METHOD AND APPARATUS FOR OUTLINE FONT CHARACTER GENERATION IN DOT MATRIX DEVICES

BACKGROUND OF THE INVENTION

1. Field of the Invention

This invention relates generally to methods and apparatus for converting electronically stored image data into a form which can be used to drive a dot matrix output device. More particularly, the present invention relates to an improved method and apparatus for implementing a scan-conversion theory used to provide shape filling of characters/graphics in spline outline formats in an efficient real time image processing system including dot matrix output devices such as cathode ray tubes and dot printing devices, where image data is converted from a graphical/mathematical format to a display or print device format (i.e. a series of dots/pixels).

2. Brief Description of the Prior Art

Two essential processes required to generate any two-dimensional shapes from the original outline formats are "scan-conversion" and "shape-filling". Scan-conversion is the process of selecting the pattern of device pixel dots which match the mathematical representation of the image outline to be displayed, while filling is the process of turning on device pixel dots which fall within the interior area bounded by the outline pixel dots generated from the scan-conversion process. In today's applications where the majority of the images require the use of filling, for example, typographic characters, most of the scan-conversion methods of the prior art do not optimize quality and performance. It is desirable that printed or displayed characters replicate the authentic design at an acceptable speed. While different typographic designers may choose different formats to store the type designs, such as vectors, arcs, Beziers, B-spline, etc., it is more desirable for a commercial product to use one general set of scan-conversion and filling methods to adapt various available font standards,, rather than to use several independent methods for different formats.

In an early study of this field, reported in a scientific article entitled "Algorithm for Computer Control of a Digital Plotter" by J. E. Bresenham (IBM Systems Journal, Vol. 4, No. 1, 1965), a scan-conversion method for filling character outline shapes generates darker, bolder shapes than the actual character designs and has a deleterious effect which is most visible at smaller point sizes and/or lower resolution raster devices where there is a constraint on the number of pixels available for each specific image. Bresenham's later study entitled "A Linear Algorithm for Incremental Digital Display of Circular Arcs" (*Communication of the ACM*, 20(2), February, 1977, pp. 100–106; see also *Fundamentals of Interactive Computer Graphics* by J. D. Foley and A. Van Dam, Addison-Wesley Publishing Co., 1982, pp. 433–436, 461), describes a scan-conversion concept which is specific to particular arc types. The study done on the filling methods was separate from the research on the scan-conversion processes, and, as a result, these independent findings can not be merged to offer a uniform, compatible solution.

U.S. Pat. No. 4,626,838 issued to Shigeo Tsujioka et al. on Dec. 2, 1986, entitled "Filled Shaped Generating Apparatus", discloses a technique employing interior filling and parity scan line filling concepts in a hardware module to perform the polygon fill function at a faster speed. In Tsujioka's design, a microprocessor is used to perform the Bresenham algorithm scan-conversion function. The polysegments generated by the microprocessor are fed to a hardware filling module, which comprises one "Filling Starting/Ending Point Generating Circuit", one "Filling Starting/Ending Point Memory", one "Contour Memory", and one "Filling Circuit". The result is an interior bitmap which is written to the "Refresh Memory" to be displayed on a cathode ray tube (CRT). In Tsujioka et al., the coordinate values representing the polysegments are in an integer form. The integer values are sent to the "Filling Starting-/Ending Point Generating Circuit" to calculate the address of the Filling Starting Point and the address of the Filling Ending Point for every line segment in the polysegment. Because the coordinates are in the integer and not real number form, fine curve nature such as the serif of a character might be lost in the process. To fill the polygon interior and to paint the polygon contour, two separate memories, "Contour Memory" and "Filling Starting/Ending Point Memory", are used in the Tsujioka et al, method.

U.S. Pat. No. 4,745,575 issued to Adrian Hawes on May 17, 1988, entitled "Area Filling Hardware for a Color Graphics Frame Buffer", discloses a technique using hardware to accomplish area filling. A microprocessor is used to perform the Bresenham algorithm of scan-conversion. Polysegments generated by the scan-conversion microprocessor are fed to a hardware filling module. Hawes uses one single Auxiliary Memory to store the outline of a polygon area, and stores the Filling Starting Point and Filling Ending Point information for all the horizontal filling spans involved in the scan-converted polygons. Since the design is based on the integer Bresenham algorithm, it suffers the same quality problem as in the Tsujioka et al. method when it is applied to render outline fonts; but the Hawes design saves one set of memory.

A scientific paper entitled "Vertical Scan-Conversion for Filing Purposes" by R. D. Hersch (*Proceeding Computer Graphics International* 88, Geneva, Springer Verlag, 1988), reports on studies of scan-conversion methods and describes a method for solving the incompatibility issue of scan-conversion and filling approaches. Splines are subdivided into variable lengths of polysegments which have non-integer vertices. From intersections between the polysegments and scan lines, the algorithm determines two transition pixels for each horizontal span as the beginning and ending indicators. Each transition pixel indicates a color change, from black to white, or vice versa. Between the two transition pixels are interior pixels which are filled by applying a "parity scan line fill method". In order to calculate the intersection and locate the transition pixels, a time-consuming geometrical computation is performed. The higher the resolution, the more calculations are involved.

U.S. Pat. No. 4,937,761 issued to Christopher Hassett on Jun. 26, 1990, entitled "Method and Apparatus for Enhanced Speed Graphic Image Processing", discloses a technique for rendering outline fonts using hardware. In Hassett, after a line or curve is scan-converted ("discrete point conversion" in Hassett's terminology) to polysegments, the coordinate values representing the polysegment are encoded in real numbers. The fine nature of the line or curve is preserved since the polysegments are encoded in real numbers. In the Hassett method, the scan-converted polysegments are further transformed to the coordinate resolution of the target marking engine. Scaling up or down operations may be applied to the polysegments during the "transforming" process. Hassett uses a dithering technique to smooth the polyline segments which are further scan-converted during the "transforming" step. The final scan-converted and dithered polysegments are separated as a dithered image outline shape and a map of interior pixels to be filled, which are then combined for receipt by the raster operator. By keeping the fractional part of the scan-converted coordinate values, Hassett's method provides better precision in determining the outline point, filling starting point, and filling ending point. However, two separated memories are required to store the Outline Points and Filling Starting Point/Filling Ending Points. The final bitmap image is provided by combining the outline image and the filled image resulting from parity filling all the Starting Points/Ending Points. Since the object outline is generated by the conventional scan-conversion algorithm (Bresenham algorithm is used as the example), the dithering technique is used to improve the bitmap image quality in Hassett's approach.

SUMMARY OF THE INVENTION

An object of the present invention is to provide an apparatus and method for accelerating the vertical scan-conversion process to determine discrete transition pixels of image scan spans without frequently requiring the computation of scanline-polysegment intersections.

Briefly, a preferred embodiment of the present invention includes a normalized polysegment generation engine for converting spline data to normalized polysegment data, a vertical scan conversion engine comprised of a decision table transitioner (DT) unit for identifying the location of a transition pixel relative to each polysegment or indicating that an identification cannot be made, intersection transition calculating unit (IT) for calculating the position of a transition pixel relative to each polysegment, and a transition pixel coordinate generating unit responsive to the normalized polysegment data and input received from the DT and IT units and operative to generate signals corresponding to the X and Y coordinates of each transition pixel, and a parity filling engine responsive to the x and y coordinate segment and operative to generate bit mapped character image data for use in driving a bit map print or display device.

To better approximate the outline character splines into discrete pixel representation, the present invention restricts polysegments to lengths less than one pixel diagonal. These polysegments are called "normalized polysegments" due to use of a normalizing process called "adaptive control" which looks ahead to assure that the distance from the current starting point to the next landing point is not longer than one pixel diagonal in terms of x and y displacements. Having all polysegments normalized, the circuitry of the present apparatus can achieve higher efficiency and smaller design size.

The normalized polysegment concept reduces the scope of problem-solving effort, because for any current point (CP), its possible next point (NP) will be located within the current pixel or the eight neighboring pixels of the current pixel. Each pixel is divided into four quadrants to increase the precision of approximating the curves. Therefore, from the starting point (CP) in one of the four quadrants of the current pixel, there are 36 possible landing quadrants in the current and neighboring pixels. All the combinations are mapped into a decision table having 144 entries.

The adaptive-controlled normalized polysegment combined with the vertical scan-conversion approach implemented in a decision table offers a higher quality of character image filling, as well as preserves type design integrity by minimizing curve distortion. The DT/IT pair improves the speed of finding transition pixels, as compared to prior art computation-intensive methods. The present invention and apparatus deliver high-speed output and near-authentic quality to support various outline font formats.

IN THE DRAWING

FIG. 2a shows an enlarged view of pixel arrangements from Bresenham's method and the present vertical scan-conversion method;

FIG. 2b shows how Bresenham's method and the present vertical scan-conversion method determine the color of pixels (black or white) along boundary segments;

FIG. 15 shows a complete decision table layout;

FIG. 17 illustrates the result of the same example shown in FIG. 16 after checking against the decision table;

FIG. 22 illustrates a truth table implementing the decision table of FIG. 15;

DETAILED DESCRIPTION OF THE PREFERRED EMBODIMENT

The present invention relates to a vertical scan method and apparatus that can be applied to various dot matrix devices, such as laser printers, cathode ray tubes, electrophotographic printing machines, etc., to speed up the process where a variety of graphical/mathematical formats of objects are converted to raster images displayed or printed thereby. The apparatus described herein is directed specifically to circuitry for laser printers and display devices, realized by implementing the present invention; such circuitry can handle multi-format outline font character generation in real time applications. However, it is understood that the invention can be adapted for use in other dot matrix applications and devices to improve scan-conversion process using the same technique.

Intuitively, pixels are the actual output bits which appear on printed sheets of CRT screens. Recent developments in the desktop publishing arena provide end-users enormous flexibility and freedom in choosing typefaces, styles, point sizes, and fill methods (shading, pattern filling, etc.) to compose documents to be printed or displayed. The input formats for these different types are data stored by different font companies/designers who may have preferred formats for arc, Bezier, or others. The present invention provides input compatibility by using a uniform approach, polysegments, to handle various font formats. Furthermore, with the potential huge amount of data and types that must be processed in real time, the present invention utilizes normalized, smaller polysegments and a decision table to enhance the performance while offering high visual legibility and quality even at small point sizes or low resolutions.

Figure 1A:
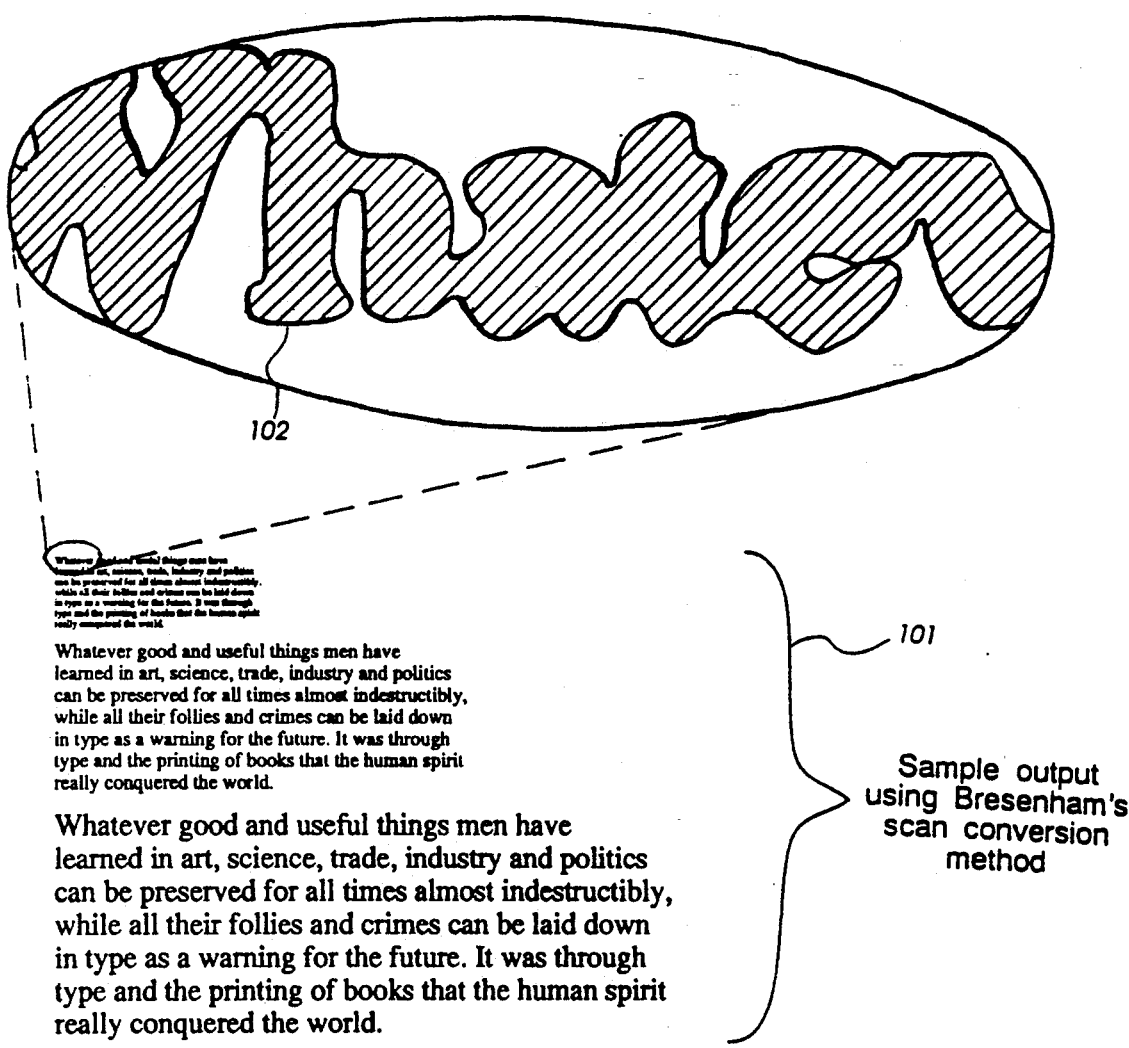
FIGS. 1a and 1b show the comparison of the output quality of Bresenham's scan-conversion method vs. the vertical scan-conversion method with adaptive control of the present invention.
Figure 1B:
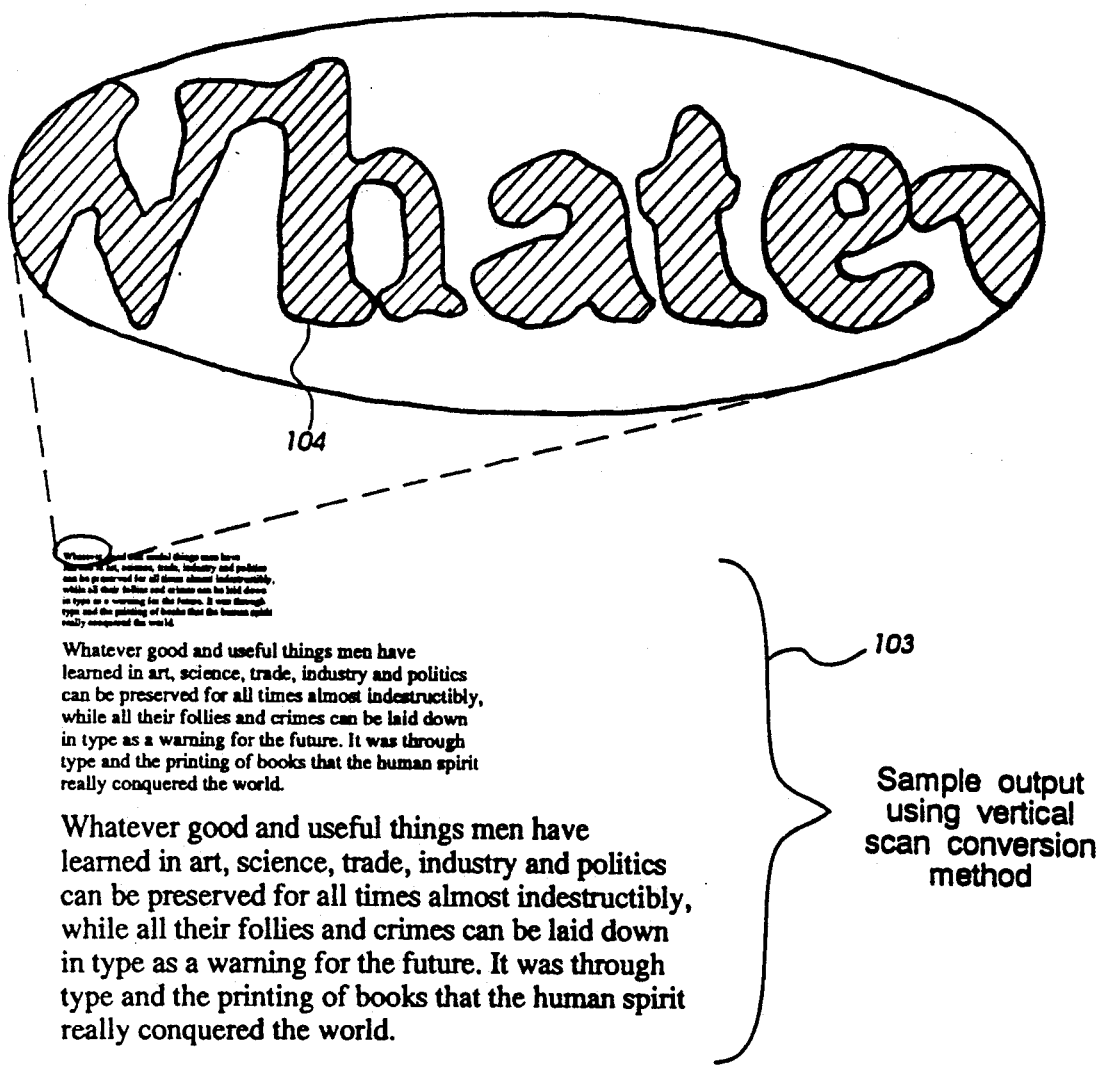

At smaller point sizes, the number of pixels available to form the character shape is limited. The manner in which the character shape is generated and filled greatly affects the visual impact on the reader. FIGS. 1a and 1b show two examples of print samples: FIG. 1a depicts print generated using Bresenham's scan-conversion method which generates dark, bold characters of the type shown at 101 and 102; the present vertical scan-conversion method as shown at 103 and 104, in contrast, generates cleaner characters. Both examples use 4, 8 and 12 point sizes. At point size 4, the vertical scan-conversion method offers better legibility than Bresenham's. At point size 8 and 12, Bresenham's sample looks like a bold typeface rather than the regular design typeface.

FIG. 2a shows graphically how color (black or white) of the pixels around the outline is determined by these two scan-conversion methods. For Bresenham's scan-conversion method depicted at 111, all the pixels located on the outline 113 are dark boundary pixels 116. The pixels within the boundary pixels are called interior pixels 115 and will be filled. The Bresenham method compares the distance 114 between the outline and the two adjacent pixel centers. The pixel with the shorter distance from the pixel center to the boundary outline is determined to be "ON" (black filled). On the other hand, the vertical scan-conversion shown at 112 turns on fewer boundary pixels 117. Only the pixels which have more than 50% of the pixel area falling inside the outline will be black filled. The pixels which are turned on by Bresenham's method but which are not turned on by vertical scan-conversion are illustrated by the unshaded dotted circles 118. As shown in FIG. 2b, the vertical scan-conversion only turns on pixels which fall into the filling path 131, 132 more than 50% of the pixel area. This approach implies that if a pixel center falls inside the outline, then it is most likely to have more than 50% of its area inside. If a pixel 133 has less than 50% of its area falling inside the filling path, then it will be left white. In contrast, Bresenham's method does not measure the area within the filling section, but measures the distance 137 from the outline 134 to the pixel center to determine the ON (136) or OFF (135) property. If the slope of the outline 134 is less than 45 degrees, then the outline is considered a near-horizontal segment and the method will compare the adjacent two pixels 135, 136 vertically above and below the outline segment. In the case of a near-vertical outline segment 141, Bresenham's method compares the two horizontal pixels 138, 140 adjacent to the segment 141.

Figure 3:
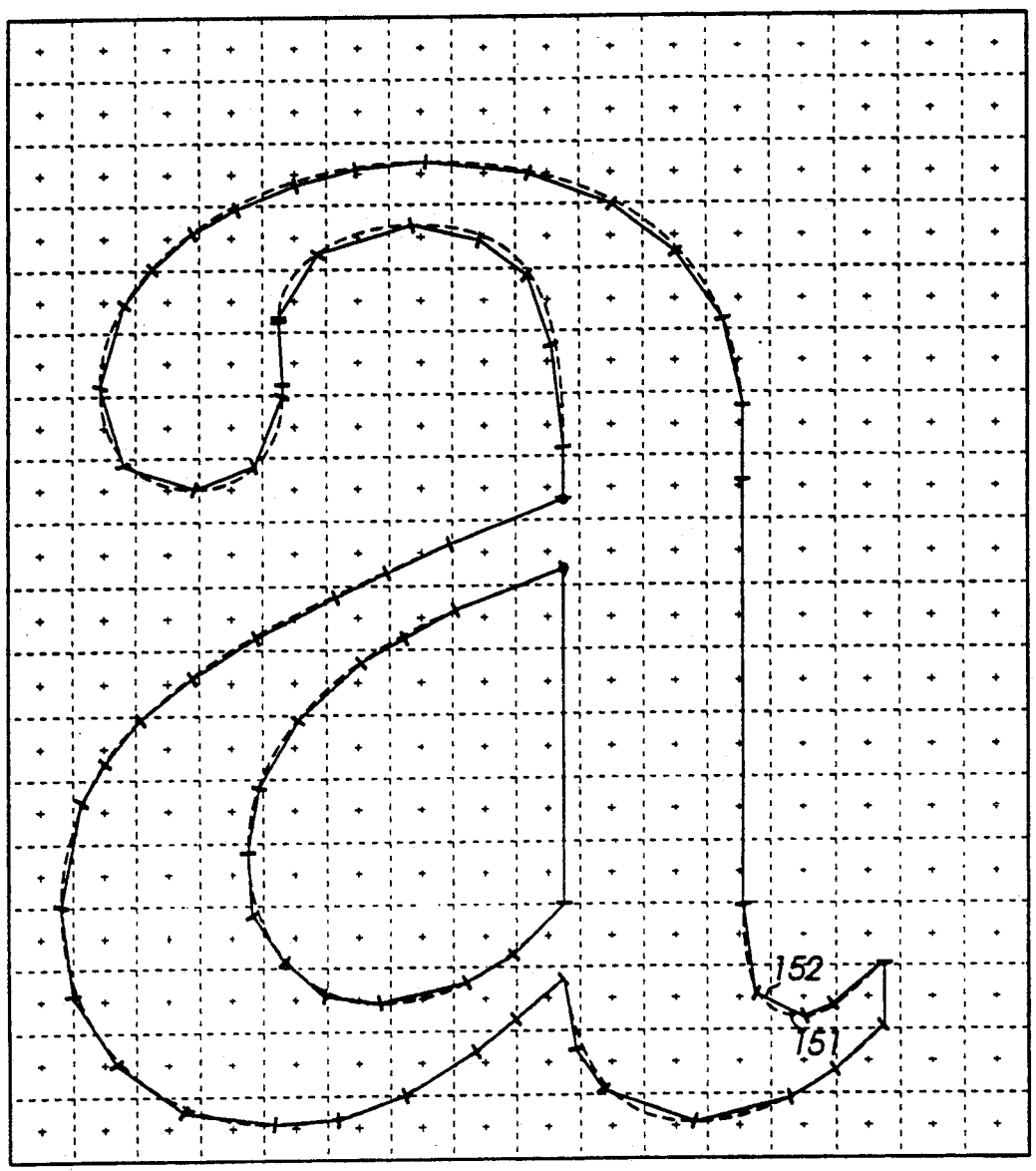
FIG. 3 illustrates how splines are broken into smaller pieces of polysegments to approximate the type shape.

The present invention utilizes a polysegment approach to handle various font formats. Splines 151 (curved outline segments), illustrated in FIG. 3 by dotted lines, are broken into smaller straight lines called polysegments 152 to approximate the spline curves. The process of dividing the polysegments later proves to be a crucial step to achieve quality and speed. These polysegments are used to generate intersection points with scan lines.

Figure 4:
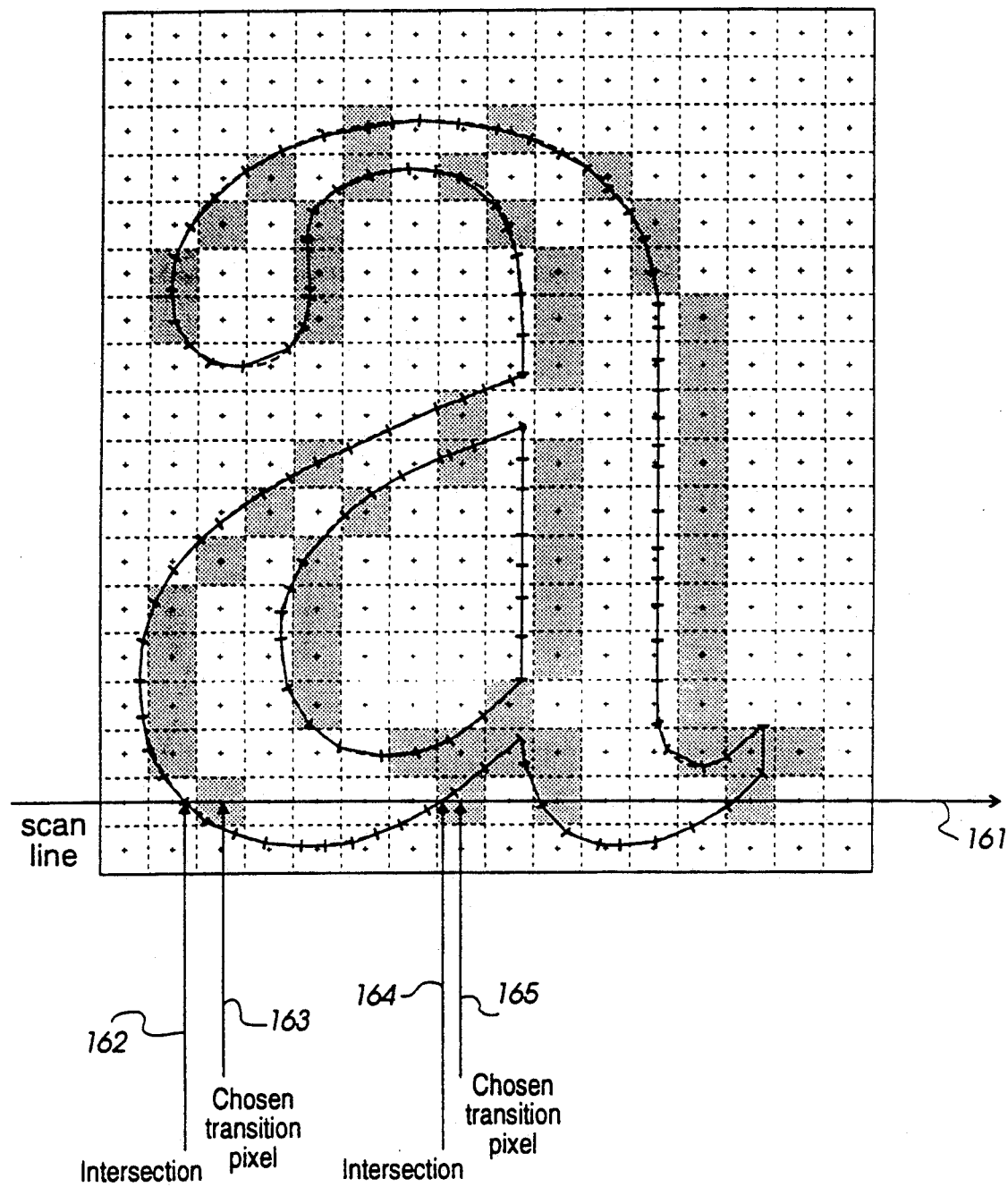
FIG. 4 illustrates the method of determining transition pixels by locating scanline-polysegment intersections.

In FIG. 4, for every intersection 162, 164 between the scan line 161 and a polysegment, there is a pixel 163, 165 chosen to be the transition pixel. A transition pixel is defined as that pixel whose centerpoint is to the immediate right of an intersection. A transition pixel marks either the beginning or one pixel after the end of a horizontal span to be filled; or in other words, a change in color (black to white or vice versa).

Figure 5:
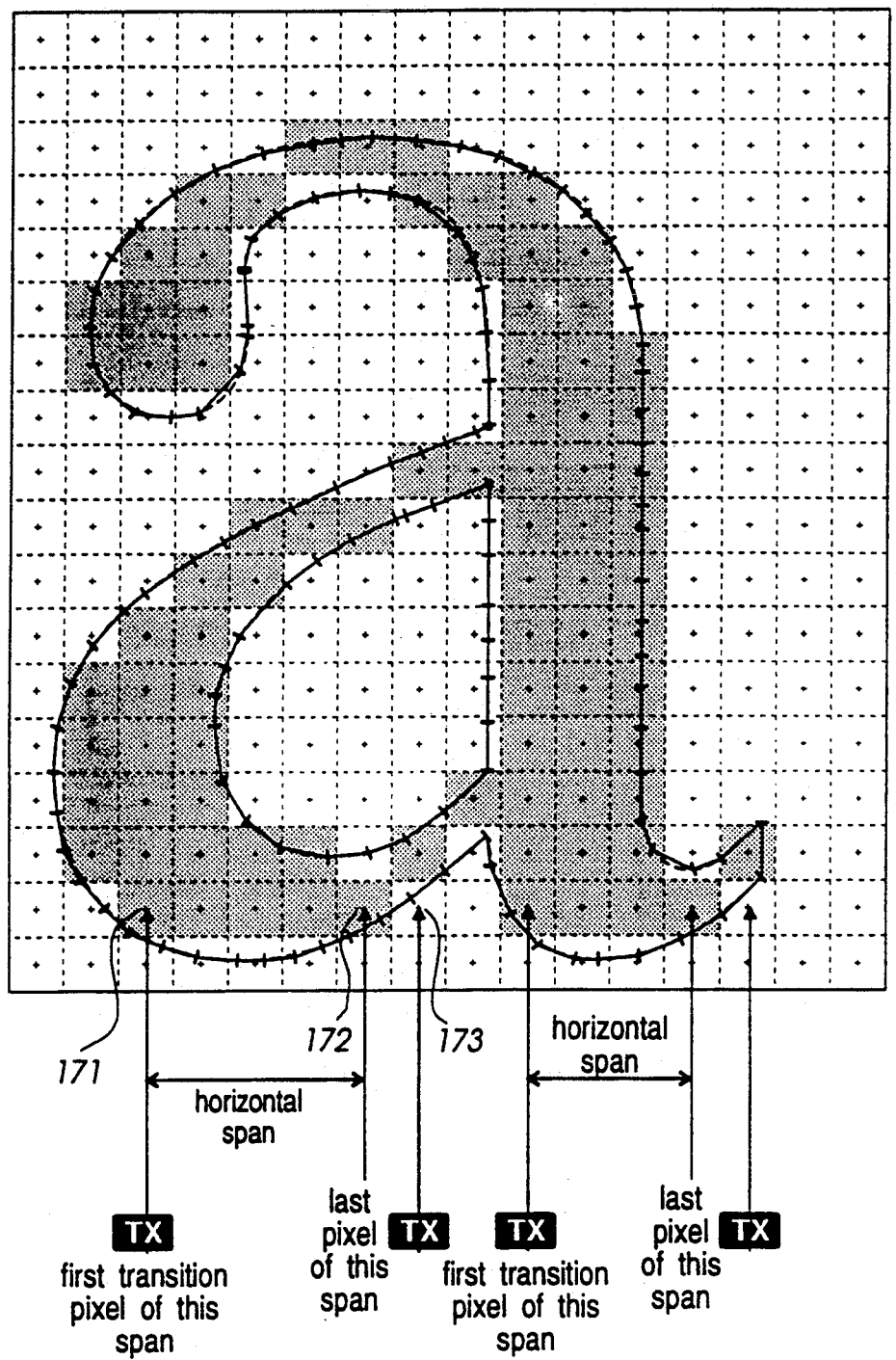
FIG. 5 illustrates the filling result after transition pixels are identified.

As shown in FIG. 5, the first transition pixel 171 of one span indicates the beginning of the fill process. The fill process continues until it foresees the next pixel as being the other transition pixel 173. The last pixel to be filled in one span is the pixel 172 before the second transition pixel 173 in one pair.

Figure 6A:
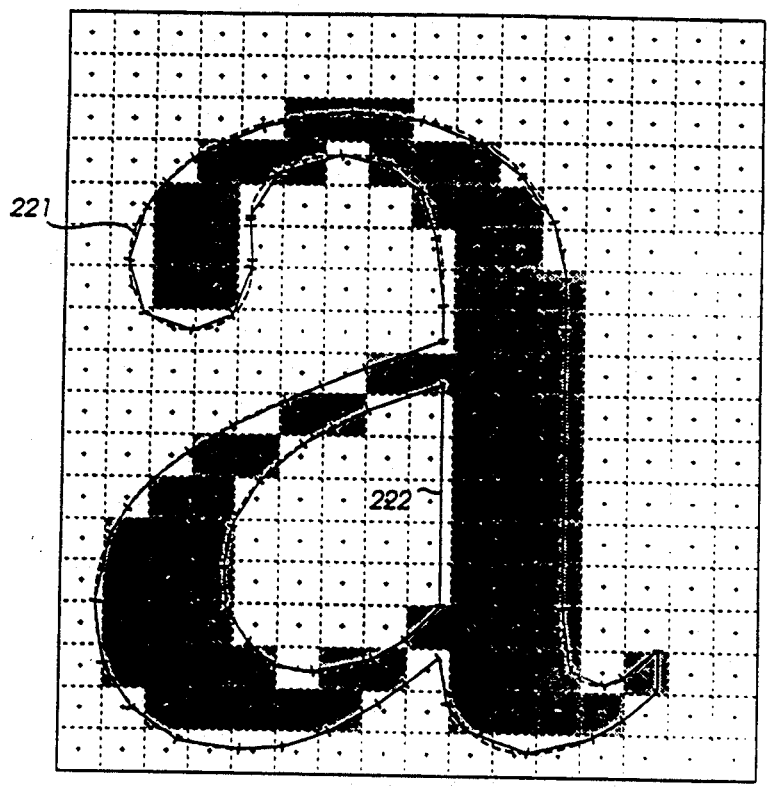
FIG. 6a illustrates a filled character with various lengths of polysegments.
Figure 6B:
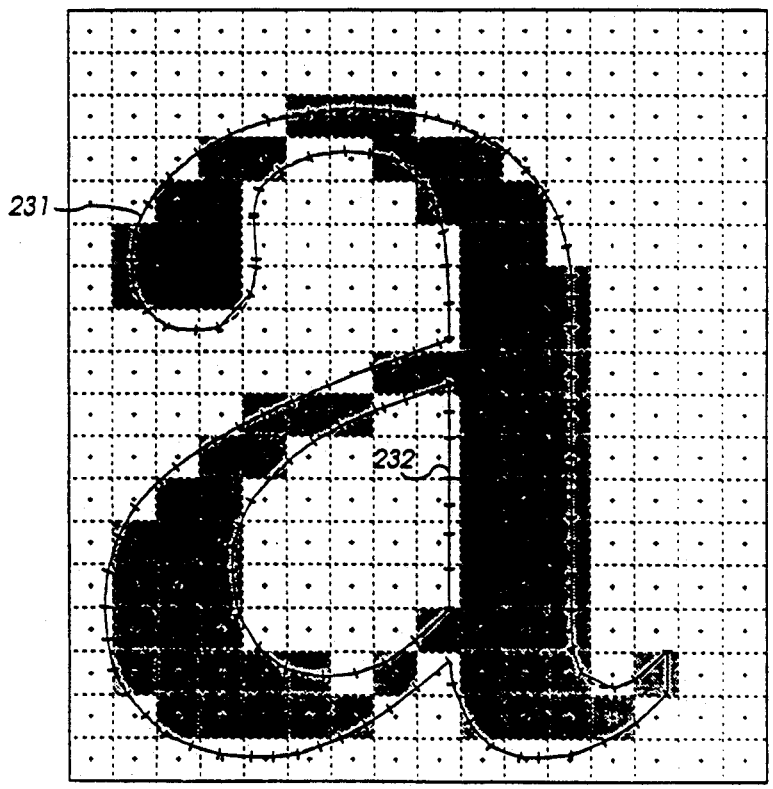
FIG. 6b illustrates a filled character with normalized-polysegments whose lengths are all less than one pixel diagonal.

However, the polysegment method may conclude different results, as shown in FIGS. 6a and 6b. In FIG. 6a, polysegments 221, 222 have various lengths; some are much longer than others. In FIG. 6b, all polysegments 231, 232 have lengths less than the diagonal length of one pixel. These segments have been normalized by the adaptive control subsystem provided in the present apparatus. Even though the amount of data increases for more polysegments involved, the complexity of each intersection event reduces. With the pipeline approach used in the present apparatus, the performance gain due to the simplified design surpasses the data flow overhead.

As will be described in detail below, the input to the apparatus implementing the present invention is in the form of scaled character outline data. As suggested above, the outline data is first converted into normalized polysegment data using a suitable polysegment generation engine such as that described in the Lien et al. U.S. Pat. No. 4,855,935 entitled "Method and Apparatus for Rendering Vectors Using Bresenhan Parameters". Then a vertical scan-conversion is performed to generate bit mapped image data for use in driving a print or display device. However, before describing the preferred embodiment of the invention, certain terms will be defined and a functional description of the vertical scan-conversion process will be given.

Figure 7:
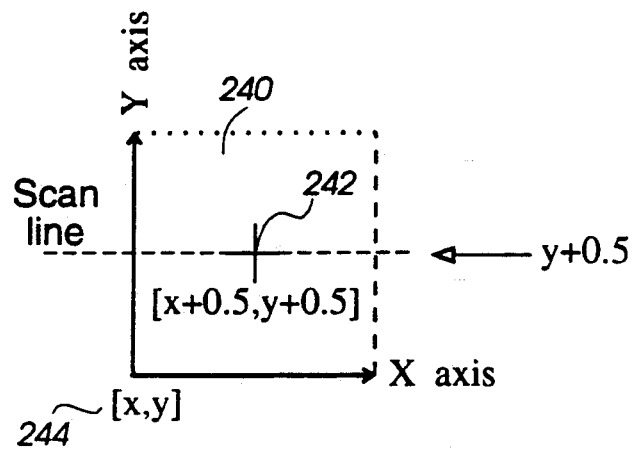
FIGS. 7 and 8 illustrate the definition of a pixel unit in an x, y coordinate system.
Figure 8:
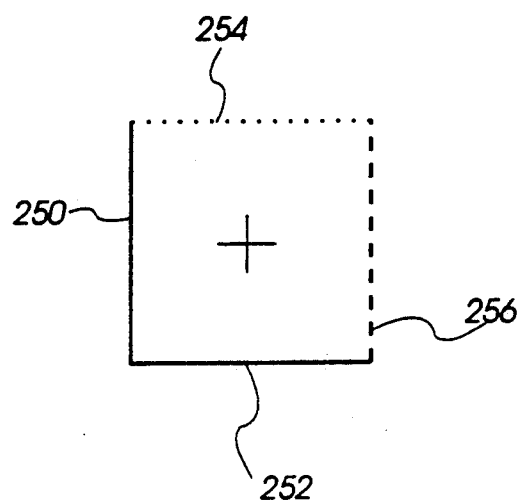

In dot matrix devices, one pixel is a discrete unit and has an integer value to represent either black or white. However, for a more precise calculation to approximate outline designs, each pixel may be measured by non-integer numbers, i.e., a fraction or an integer plus a fraction. In FIG. 7, a pixel 240 is defined using x, y coordinates; one pixel is said to be one unit wide (x direction) and one unit high (y direction). This definition allows the pixel center 242 to have a (x+0.5, y+0.5) location value where point 244 (x,y) is the starting address for the pixel. In terms of boundary definition, there is no common boundary to be shared by neighboring pixels. As depicted in FIG. 8, each pixel "owns" the left 250 and bottom 252 sides; thus, any point that falls on these two sides is considered part of the current pixel. The top side 254 of the current pixel belongs to the pixel above it, while the right side 256 belongs to the pixel to the right of it. This boundary definition avoids ambiguity arising from possible overlapping conditions.

Figure 9A:
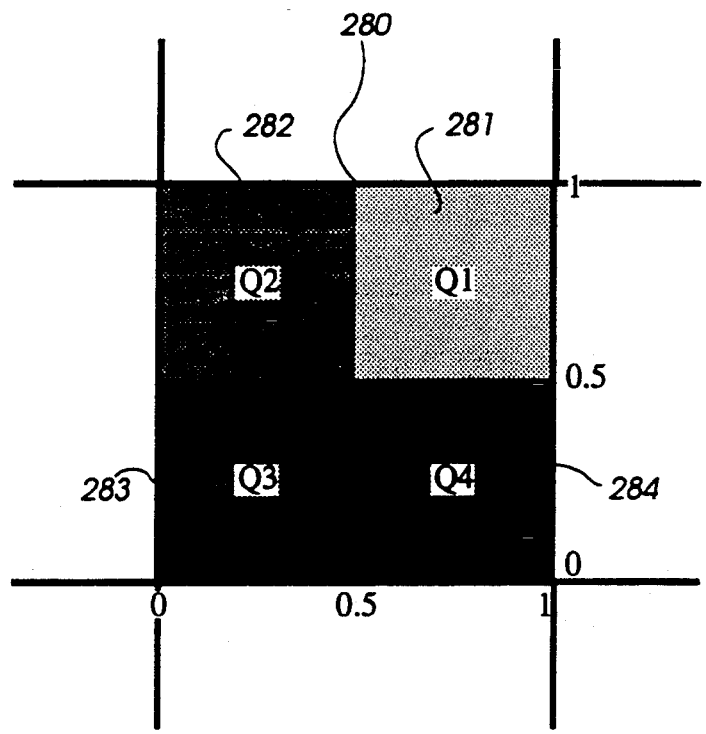
FIGS. 9a and 9b illustrate the definitions of quadrant and boundary.
Figure 9B:
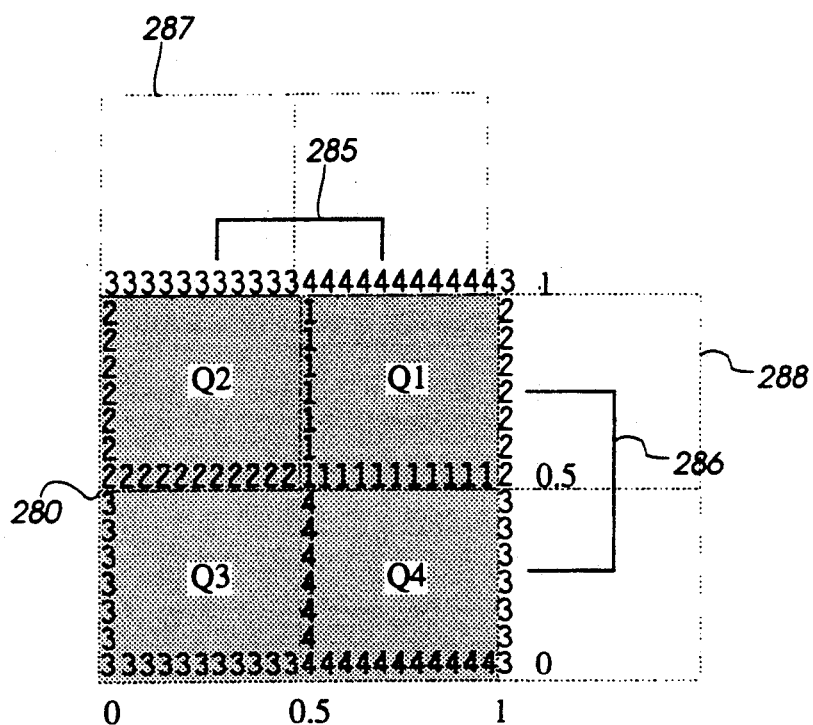

To manage the transition pixel (TX) decision making process and identify ambiguous cases, each pixel 280 is divided into four quadrants as shown in FIGS. 9a and 9b. These four quadrants are labelled Q1 (281), Q2 (282), Q3 (283), Q4 (284) in a counterclockwise direction. The boundary definition for pixels is also used for quadrants. As suggested by the numbers along the borders, the border 285 (FIG. 9b) on top of Q1 and Q2 "belongs to" quadrants Q3 and Q4 of the pixel 287 above; the right border 286 "belongs to" quadrants Q2 and Q3 of the pixel 288 to the right.

Figure 10:
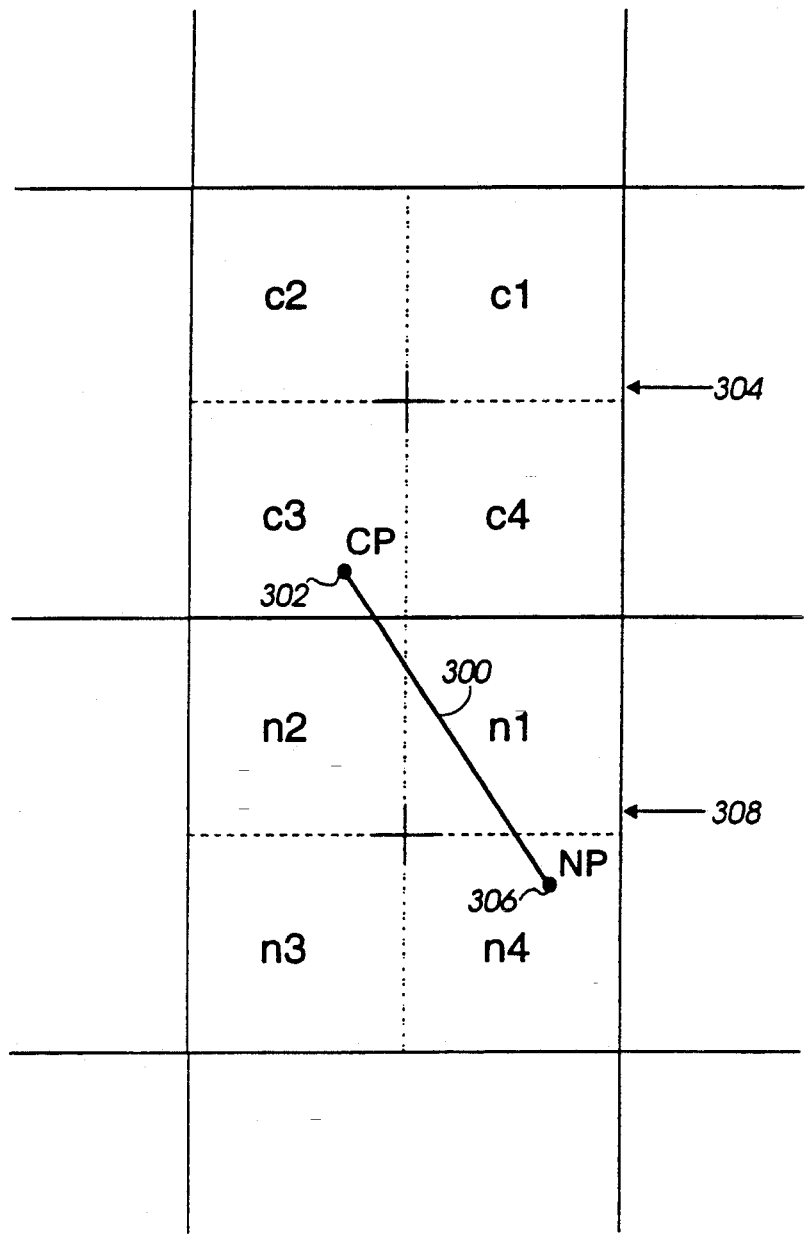
FIG. 10 illustrates the polysegment movement convention.

In order to define a polysegment with a direction property, reference is made to FIG. 10. Each polysegment 300 has a start point CP 302 located in a "current pixel" CX 304, and an end point NP 306 located in a "next pixel" NX 308. Pixel CX has four quadrants, namely c1, c2, c3, c4, and pixel NX 308 also has n1, n2, n3 and n4 quadrants. The normalized polysegments 300 are assigned directions depending on how a current point CP moves towards its next point NP.

Figure 11:
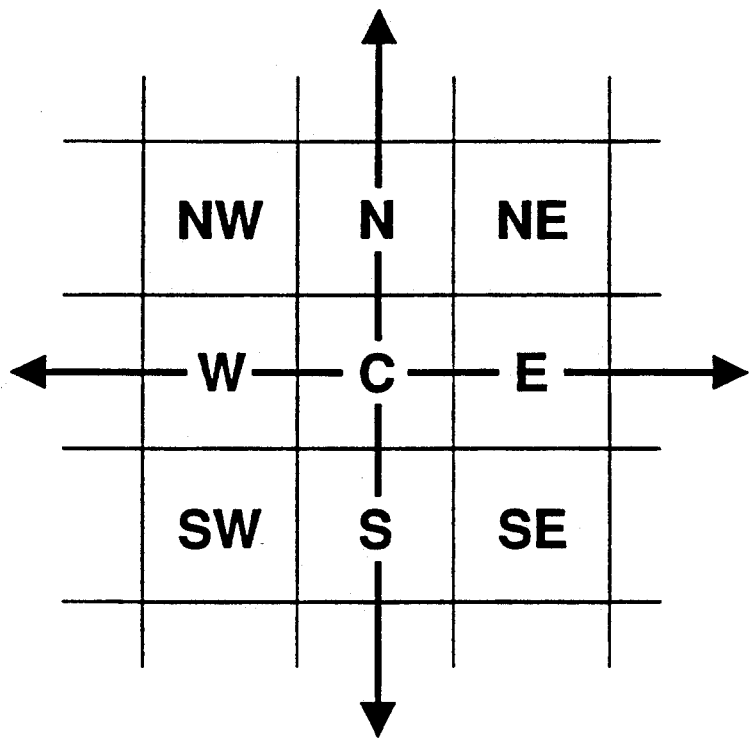
FIG. 11 shows the definition of polysegment movement direction.

FIG. 11 shows the definition of NX directions. More specifically, a polysegment having a starting point CP in the current pixel CX will have a next point NP either within CX or in one of the neighboring pixels labelled E, NE, N, NW, W, SW, S or SE. Accordingly, the direction of the polysegment will be designated as compass direction of the adjacent pixel in which the next point falls.

Figure 12:
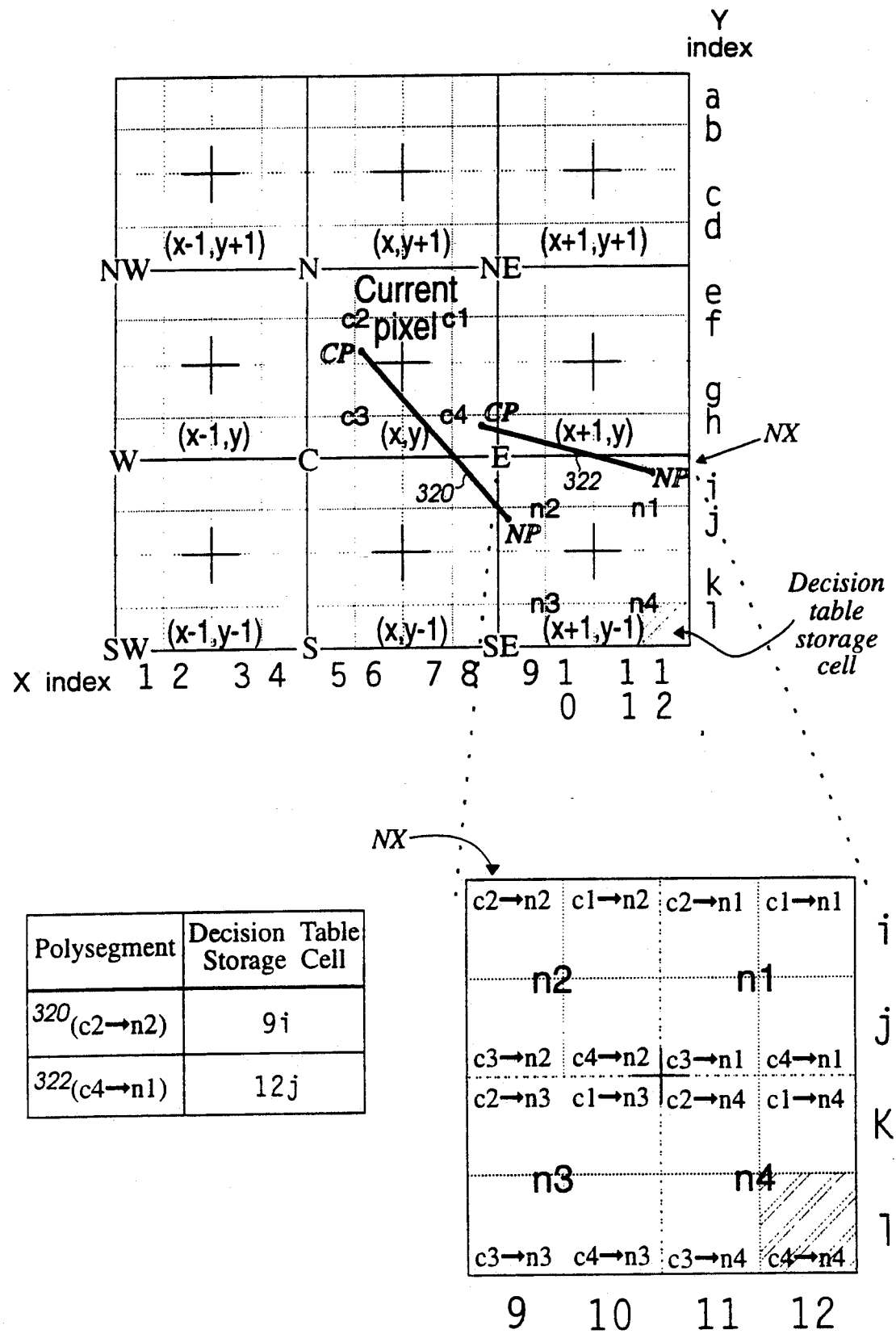
FIG. 12 shows the relationship of a current pixel (CX) and its 9 possible next pixel (NX) locations, along with the concepts of quadrant and polysegment direction, and how decision table information is stored in NX quadrants.

As shown in FIG. 12, by putting the direction and a coordinate system together, each polysegment location and direction can be recorded in a decision table. Since the current pixel has four quadrants where the starting point may reside, and 36 landing points in the 9-pixel range, there are 144 endpoint combinations. To make a decision table compact and geometrically corresponding to the actual event, all decision table information is registered at the four inside corners of the 36 quadrants of the nine possible NX pixels. The present invention provides a record keeping scheme by indexing these quadrants with "1 - 12" for x direction and "a - l" for y direction. These indices identify 144 storage cells and each cell has a pointer such as 2j, 8d, and so on. For example, as illustrated by FIG. 12, one polysegment 320 ends in the second quadrant n2 of one particular next pixel NX. If the starting point begins in the second quadrant C2 of the current pixel CX, the identification of this polysegment is C2→n2 and is stored in the cell at the upper left corner of the second quadrant n2 of pixel NX as depicted in the exploded pixel NX. Likewise, a second polysegment 322 which starts at CP in the fourth quadrant of the current pixel and ends at NP in the first quadrant of the next pixel NX will have a corresponding identification C4→n1 stored in the cell in the lower right corner of quadrant n1. According to the direction and CX-NX relation, each polysegment movement (location and direction) has a corresponding decision (identification) predetermined and stored in cells identified by their x and y. For example, the decision for polysegments 320 and 322 are stored at table locations 9i and 12j respectively.

Figure 13:
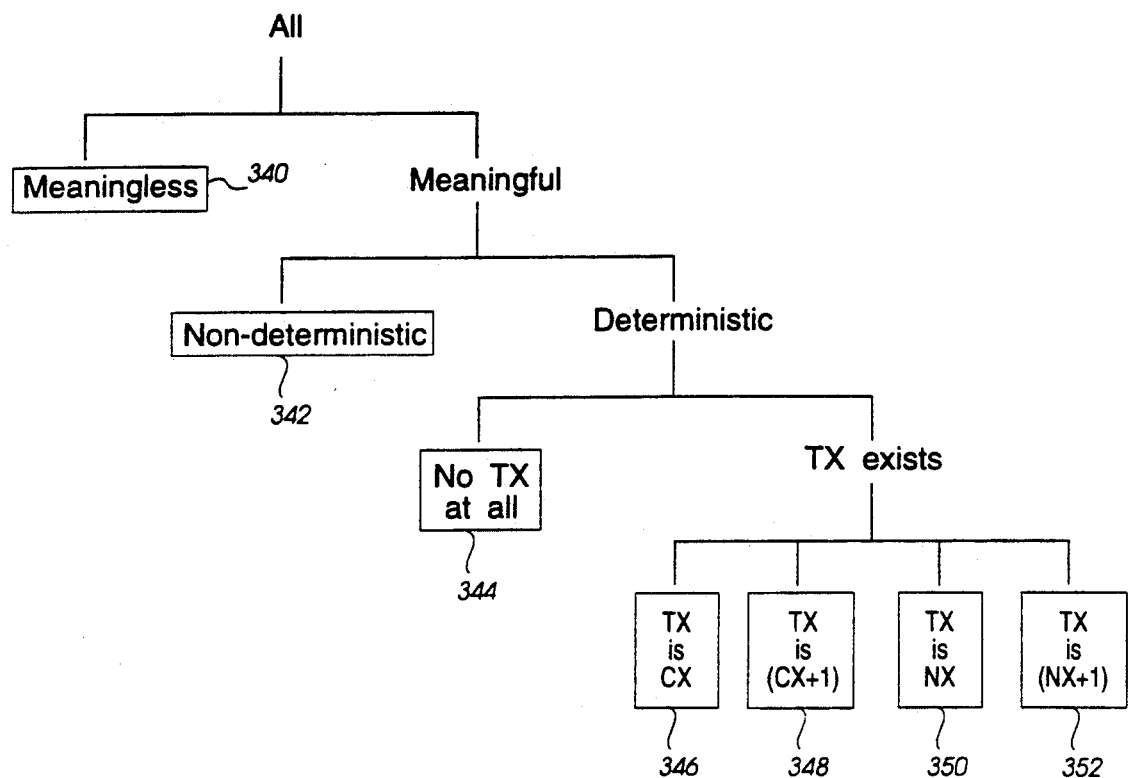
FIG. 13 shows all possible decision types of decision table entries.

By examining all 144 decision possibilities, it will become apparent that the polysegment analysis can be categorized into seven distinct decisions. The seven decisions are set out in FIG. 13 in the form of a decision tree with the possible decisions identified by the numbers 340-352. Only one decision is "non-deterministic" and will require further analysis. A "meaningless" decision is one in which the length of the polysegment exceeds the "normalized polysegment" restriction of one pixel dimension. The transition pixels for the remaining types of polysegments can be determined by the decision table alone.

Figure 14A:
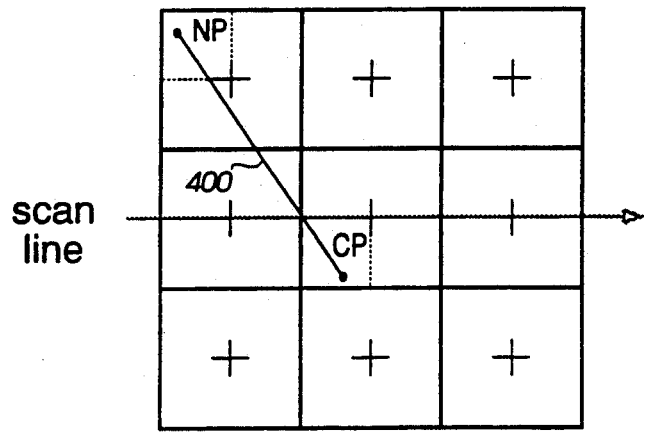
FIGS. 14a-14g illustrate several examples of polysegment types and their associated decision categories.
Figure 14B:
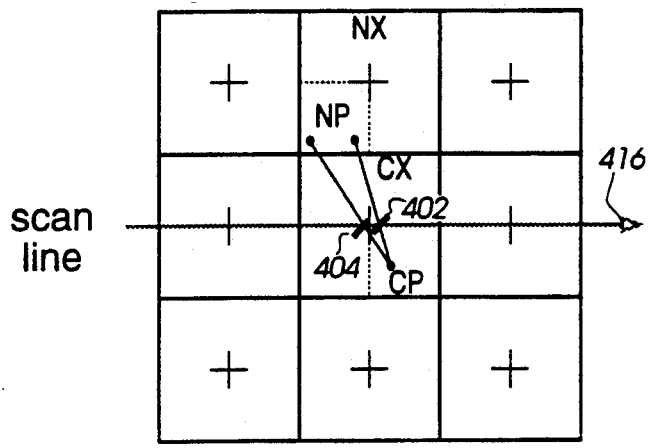

FIG. 14a shows one example of the decision type "Meaningless" which relates to a polysegment 400 longer than one pixel diagonal in length. Since all polysegments will have been normalized by the adaptive control, as will be explained below, this case should not happen. The polysegments of FIG. 14b are an ambiguous case because the intersection at 402 on the right side of the pixel center will require choice of the pixel to the right of the current pixel as the transition pixel whereas the intersection at 404 to the left of center will require choice of the current pixel as the transition pixel. This type can not be determined immediately by the decision table for a definite decision, and must be handled in another way.

Figure 14C:
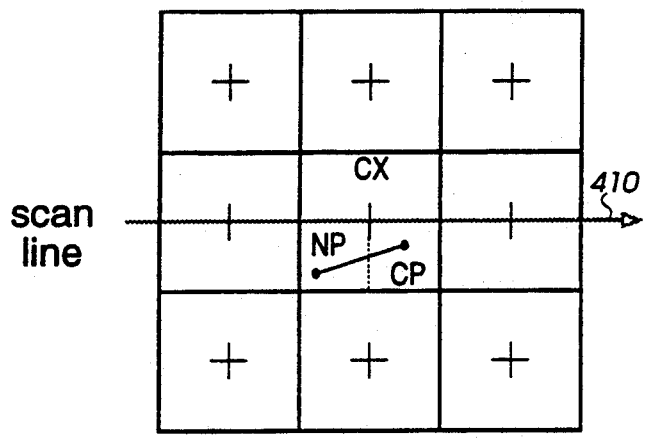
Figure 14D:
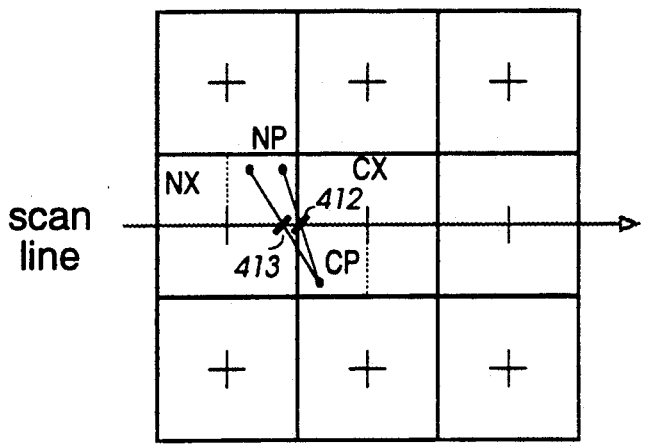

FIGS. 14c and 14d show two more examples of decision types. "No TX at all" is a decision for polysegments which never intersect the scan line 410. "TX is CX" is a decision for intersections at points 412 and 414 which require that the current pixel CX be chosen as the transition pixel.

Figure 14E:
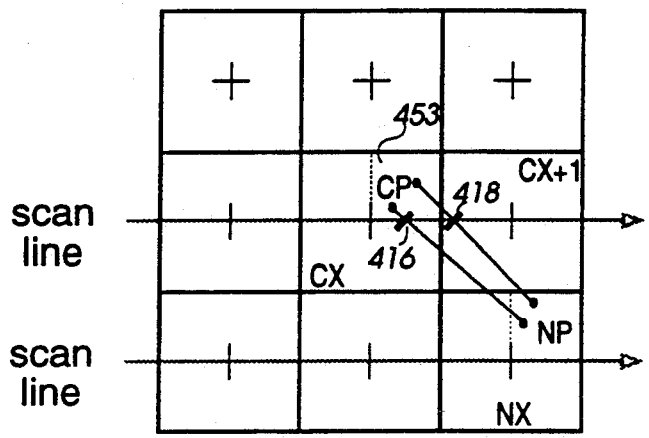
Figure 14F:
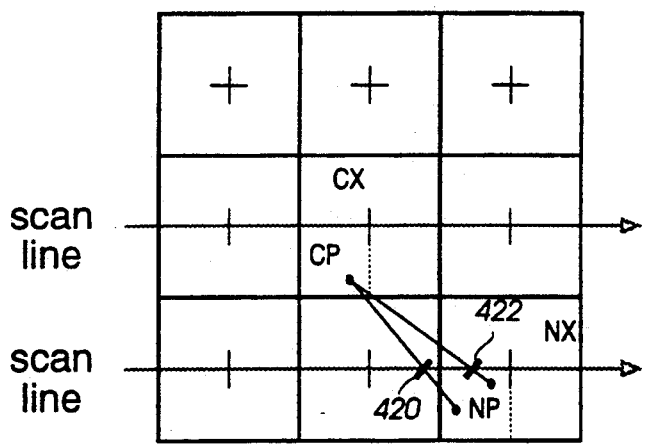
Figure 14G:
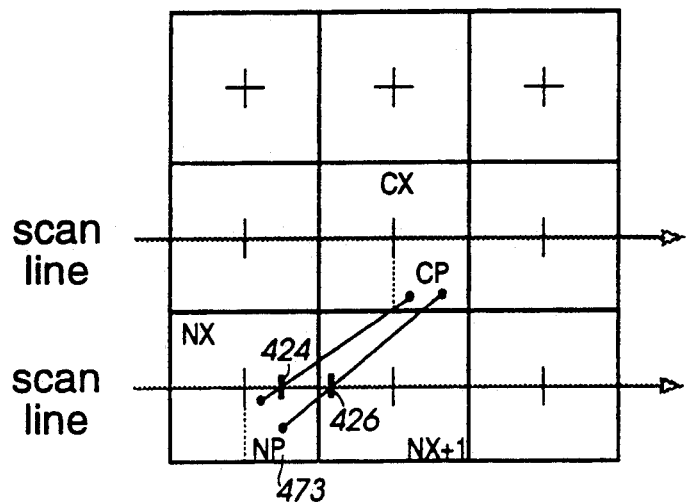

FIG. 14e shows the cases in which the intersections 416 and 418 require that the pixel to the right (CX+1) of the current pixel be chosen as the transition pixel. FIG. 14f shows the types of intersections 420 and 422 which cause the next pixel NX to be chosen as the transition pixel, therefore "TX is NX". The last decision type is "TX is (NX+1)" and is shown in FIG. 14g. Here the intersections 424 and 426 result in the pixel to the right of pixel NX (i.e., NX+1) being identified as the transition pixel.

FIG. 15 shows at 430 the complete mapping of the 144 decision entries. Each entry is represented by a mnemonic for a specific decision type. Out of these 144 entries, 44 of them are "meaningless". There are only 28 entries out of the remaining 100 meaningful entries which are "non-deterministic". This implies that about 28 percent of all normal polysegments can not be handled by this decision table. In the outline font character generation application where the present invention has particular application, the ratio is usually even lower than 28 percent because the ambiguous events are rare.

Figure 16:
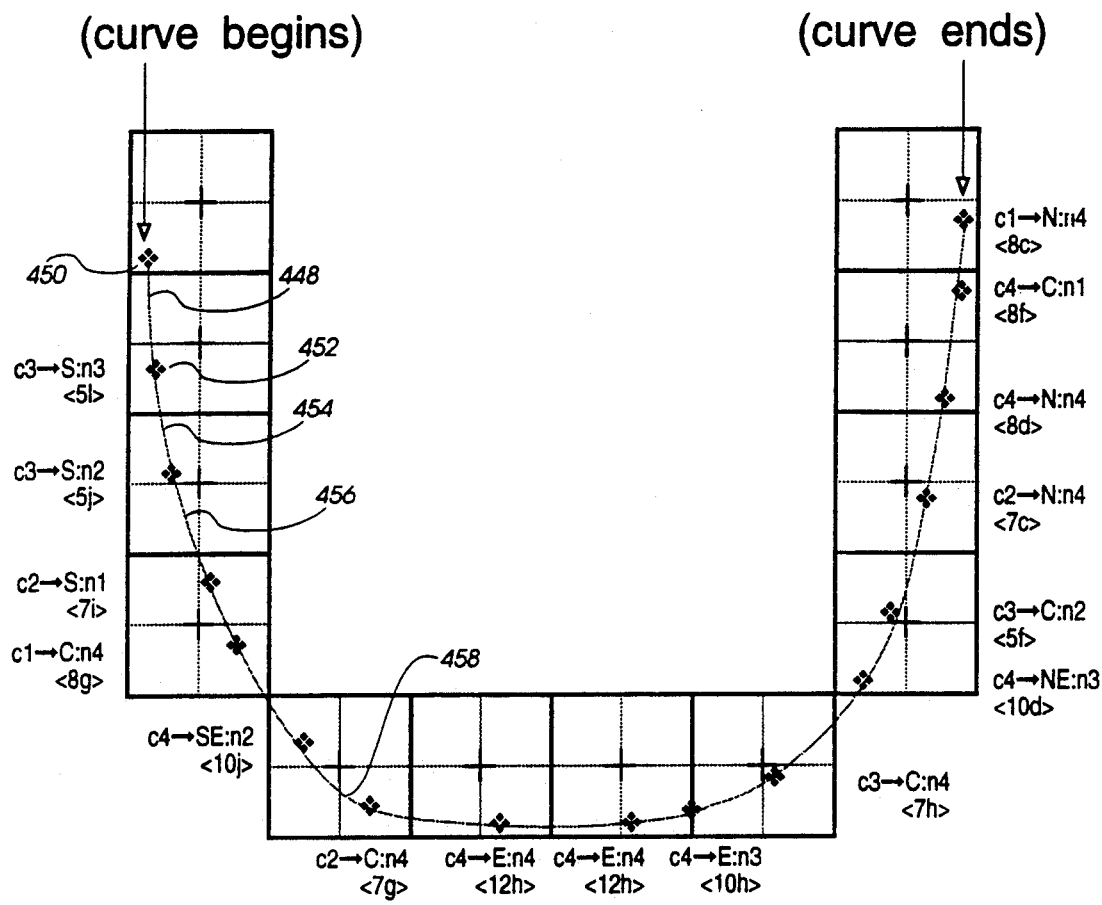
FIG. 16 illustrates an example of how and where the polysegment movement data is recorded.

FIG. 16 depicts a sample curve which is broken into polysegments with the end points shown. The polysegment 448 with the beginning point 450 and ending point 452 is tagged c3→S:n3. This means that the starting point is located in the third quadrant of the current pixel and the ending point is located in the third quadrant of the next pixel with a moving direction towards the south. In accordance with the definition in FIG. 12, the decision for this polysegment is "stored" at 5i. Similarly, the decision for polysegment 454 and 456 are stored at 5j and 7i respectively and so on.

In FIG. 17 the curve is filled by applying the decision table method. The curve is broken into seventeen polysegments,, and only two of them are "non-deterministic", i.e., 456 and 458, as indicated by the "?"s, and require additional calculation beyond the decision table lookup method.

Figure 18:
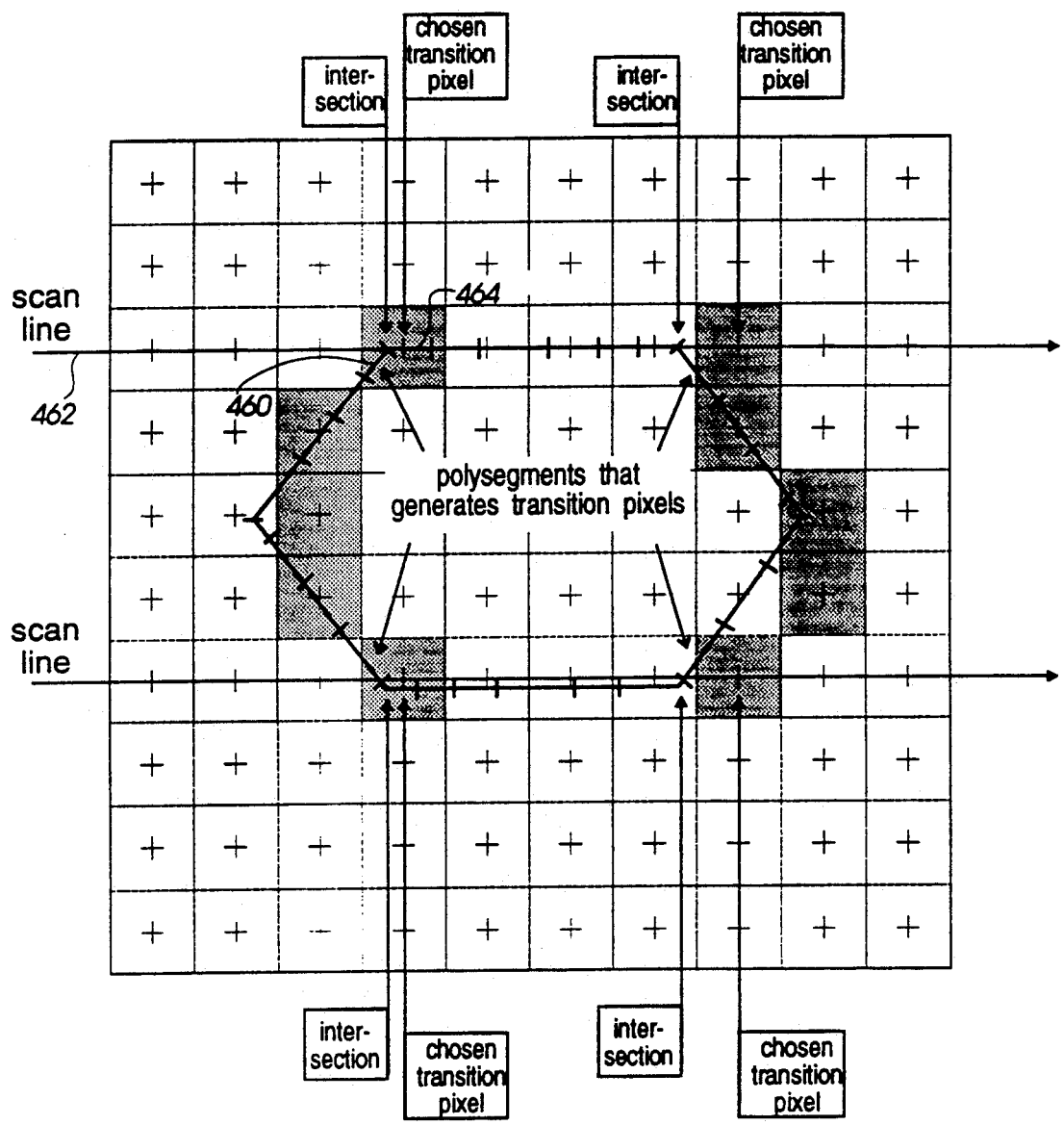
FIG. 18 shows one boundary condition and a special rule for it.

The decision table is predetermined with entries to resolve general cases which follow the standard boundary definition, as well as some special cases. For example, in FIG. 18, the transition pixels are determined by polysegments 460 which are not parallel to the scan line 462. Horizontal polysegments such as 464 on scan line 460 are treated as horizontal polysegments above or below scan lines, i.e., c1→E:n2, with the decision stored in the table location <10e> indicating a decision "no TX at all", regardless of whether the polysegment is on the scan line or not. If the table were to allow such condition to select transition pixel, a collision situation would arise to toggle on and then off some particular transition pixels, thus violate the filling process later.

Figures 19, 20:
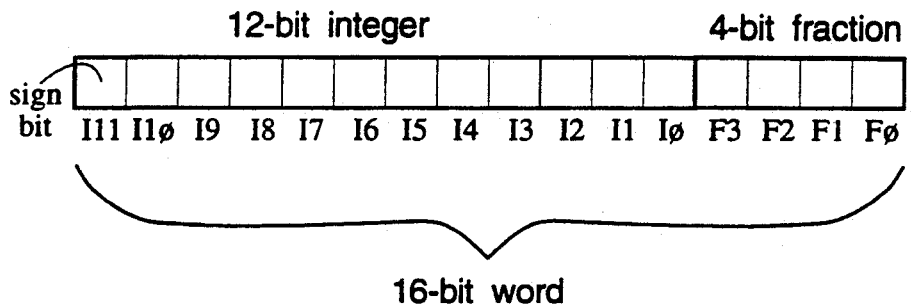
FIG. 19 illustrates the format of a 16-bit data word.
FIG. 20 illustrates a system to represent pixel space.

For "non-deterministic" cases, a geometrical calculation must be used to locate the exact position of the intersection. In order to make the decision on TX with an acceptable precision, a subpixel grid system is introduced for the calculation. The unit for the subpixel grid is one-sixteenth of a pixel; it uses a 16-bit word to record the data, as shown in FIGS. 19 and 20. The first twelve bits (I0-I11) are used for the integer portion, which can carry either a positive or negative sign. In other words, the first bit I11 is a sign bit, and the second I10 to the twelfth I0 bits are the integer value. The lower four bits F0-F3 of the 16-bit word are used to carry the fractional portion. Therefore, as indicated in FIG. 20, a pixel coordinate value is composed of sign, integer, and fraction parts. The range for valid pixel values is from $-2048 \times 0$ to $2047 \times 15$, where $2047 \times 15$ represents a number with an integer part 2047 and a fractional part 15/16.

Figure 21:
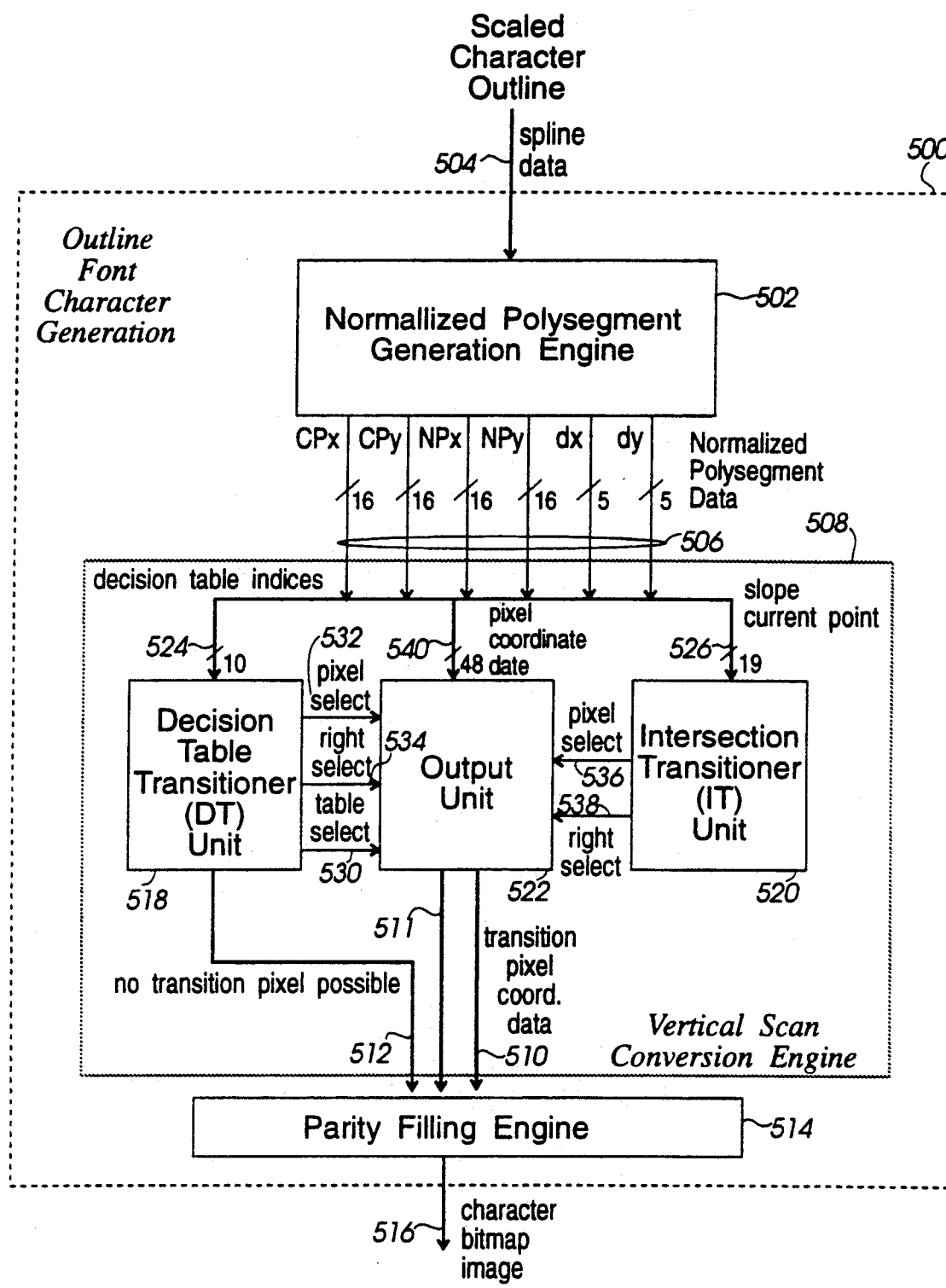
FIG. 21 is a block diagram illustrating an implementation of an outline font character generator in accordance with the present invention.

Turning now to FIG. 21 of the drawing, an implementation of the present invention in the form of an outline font character generator is depicted at 500. It consists basically of three major functional components: a normalized polysegment generation engine 502 for receiving the scaled character outline spline data input at 504 and generating 506 six corresponding pieces of information referred to as normalized polysegment data; a vertical scan conversion engine 508 for responding to the normalized polysegment data and generating transition pixel coordinate data at 510 and 511,, and at 512 an alternative indication that the current data input does not identify a transition pixel; and a parity filling engine 514 which responds to the inputs at 510, 511 and 512 to generate at 516 character bit map data.

As indicated, the output generated by the engine 502 at 506 consists of two 16-bit words CPx and CPy identifying the integer and fractional components (see FIGS. 19 and 20) of the x and y coordinates of the current polysegment endpoint CP, two 16-bit words NPx and NPy identifying the x and y coordinates of the current polysegment endpoint NP, and two sets of 5 data bits respectively indicating the x component dx and y component dy of the slope of the current polysegment. The component dx is comprised of four data bits corresponding to the fractional part of NPx-CPx plus the sign bit I11 (FIG. 19). Similarly, the component dy is comprised off our data bits corresponding to the fractional part of NPy-CPy plus the sign bit.

Vertical Scan Conversion Engine 508 is comprised of three basic functional components: a Decision Table Transitioner (DT) Unit 518, an Intersection Transitioner (IT) Unit 520 and an Output Unit 522. The DT Unit 518 is essentially a "lookup table" implementing the 144 decisions depicted in FIG. 15 and, in response to a ten-bit input at 524, is operative to generate four one-bit outputs corresponding to the decision tree shown in FIG. 13; namely, an indication on line 530 as to whether or not a transition pixel decision can be made by the DT Unit (i.e., the current pixel data is "deterministic" and therefore the table output is "true"), an indication on line 532 that the transition pixel TX is related to either the current pixel CX or the next pixel NX, an indication on line 534 that the transition pixel TX is dependent on the data on line 532, either the current pixel CX or the next pixel NX, or is the pixel to the right of either the current pixel (CX+1) or to the rights of the next pixel (NX+1), and lastly an indication on line 512 as to whether or not any transition pixel exists within CX, CX+1, NX or NX+1.

The Intersection Transitioner (IT) Unit 520 is a computational unit which from the 19-bit input at 526 mathematically determines whether or not CX, CX+1, NX or NX+1 is a transition pixel and, if so, generates identifying outputs on lines 536 and 538. However, since IT Unit 520 is much slower than DT Unit 518, its output will be ignored unless the data on line 530 indicates that the table output is "non-deterministic".

The Output Unit 522 contains logic circuitry which in response to the input on line 530 selects either the two bits of data on lines 532 and 534 or the two bits on lines 536 and 538, and operates on the 48 bits of pixel coordinate data input at 540 to develop transition pixel coordinate data on lines 510 and 511.

Figure 23:
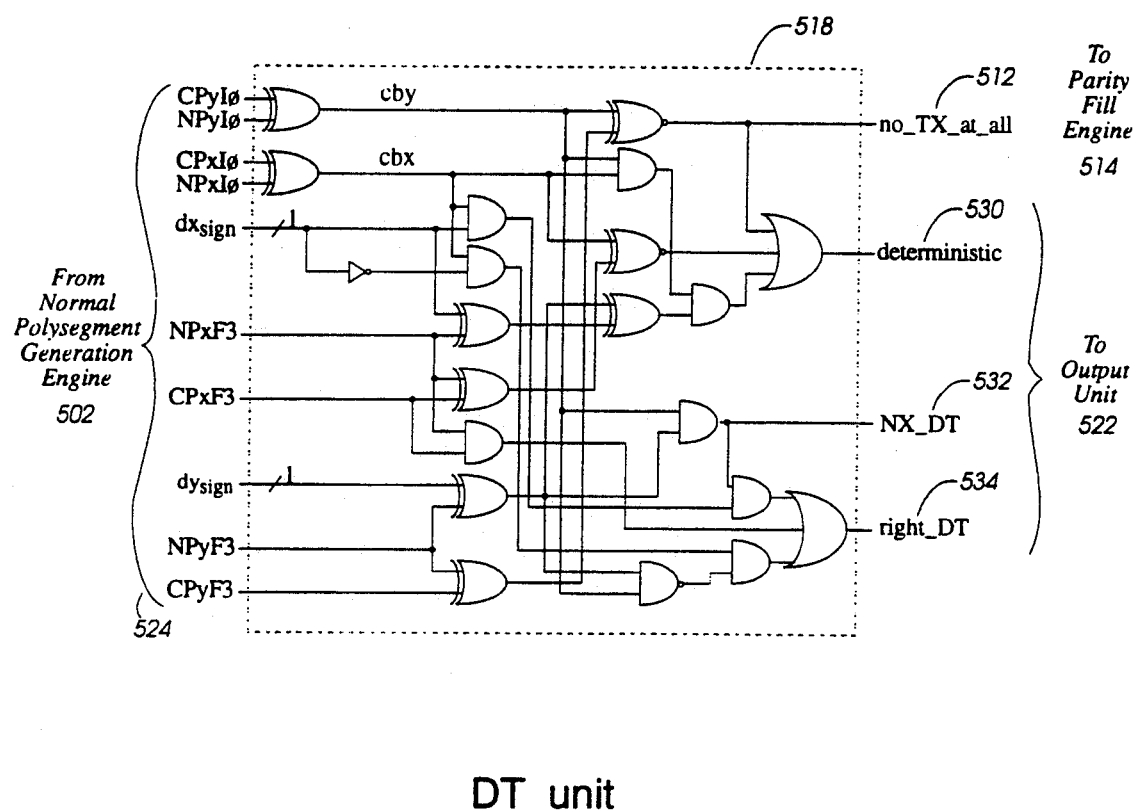
FIG. 23 illustrates the logic circuitry design of the truth table of FIG. 22.

As indicated above, the DT unit 518 uses a circuit encoding scheme to implement the 144-entry map 430 of FIG. 15 by a truth table shown in FIG. 22. The present invention utilizes a well-known Karnaugh-map method of switch theory to simplify the design. The result is a logic circuit, shown in FIG. 23, where a suffix "F3" on the input signals denotes the most significant bit of the fractional part of an input word and a suffix "I0" denotes the least significant bit of the integer part of the input word. The sign bits of dx and dy, as illustrated above in FIG. 21, are designated $dx_{sign}$, $dy_{sign}$. The carry or borrow (CPxI0 eXclusiveOR NPxI0) of x coordinate value is "cbx", and "cby" denotes the carry or borrow (CPyI0 eXclusiveOR NPxI0) of y coordinate value. The DT unit 518 has ten input signals as shown at 524 and generates four output signals:

(1) "no$_{13}$TX$_{13}$at$_{13}$all" on line 512 equals to 1 if there is no intersection, 0 if otherwise;

(2) "deterministic" on line 530 equals to 1 if the DT unit is capable of determining TX, 0 if otherwise;

(3) "NX$_{13}$DT" on line 532 equals 1 if the x coordinate of the transition pixel, TXx, is NXx or (NXx+1), 0 if TXx is CXx or (CXx+1);

(4) "right$_{13}$DT" on line 534 equals 1 if TXx is the next pixel address to the right of CX or NX, 0 if TXx is CX or NX.

Figure 24:
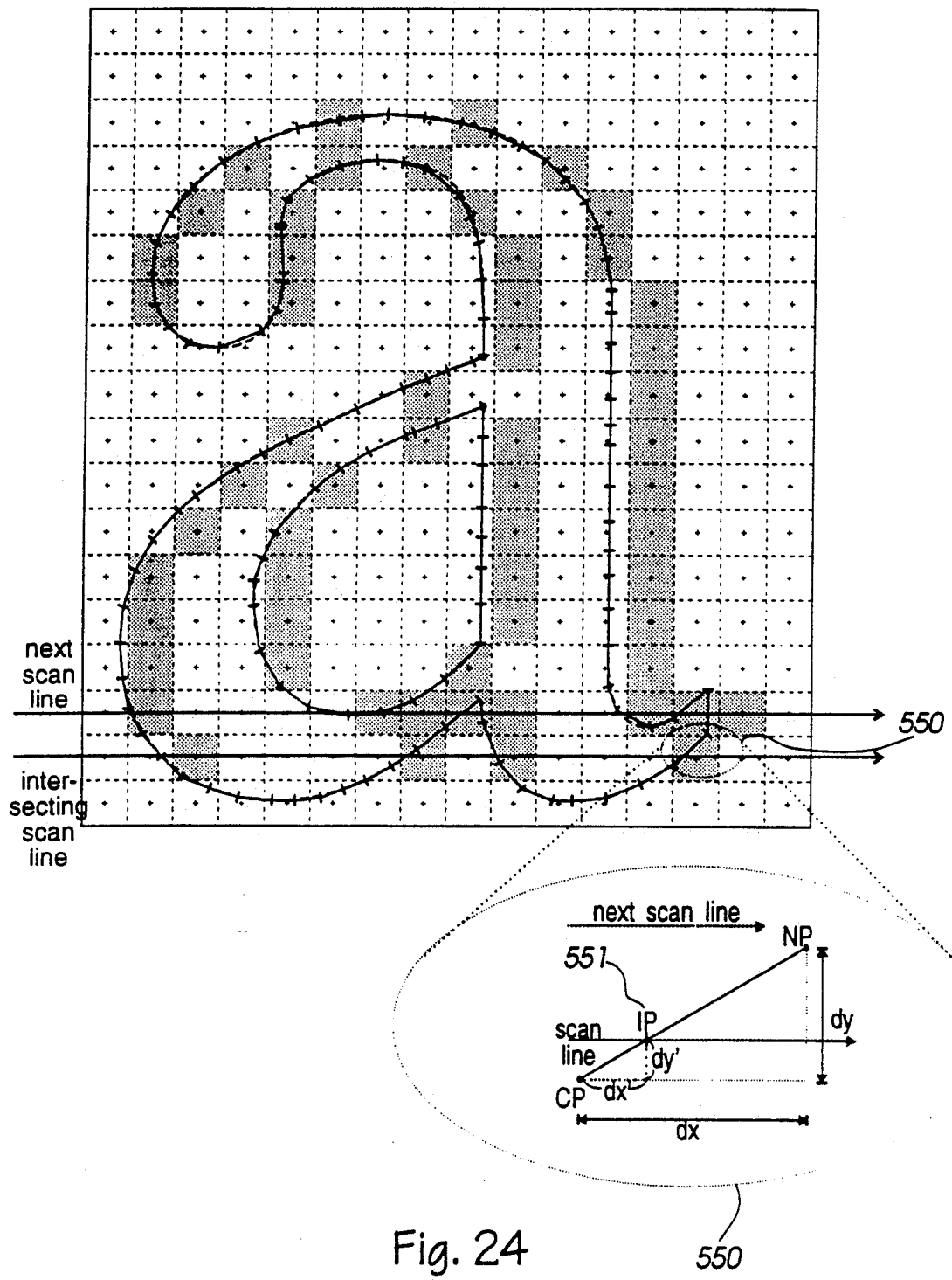
FIG. 24 shows that mathematical approach used to locate scanline-polysegment intersections.

In FIG. 24, an enlarged view of one intersection is shown at 550 and illustrates the algorithm used by the IT Unit 520 to locate the intersection geometrically. To find such scanline-polysegment intersections in a dot matrix device, one can use geometry to find the intersection point IP. Since the polysegments are generated by a predetermined method, the coordinates of each point on the polysegments can be recorded. Thus, with the current point CP and next point NP as known factors, and the scan line is a fixed factor to ascertain the value of dy, dx is easily derived.

$$CP+(dx,dy)=NP$$

$$CP+(dx',dy')=IP$$

The IT unit 520 working in parallel with the DT unit 518 calculates the x coordinate (IPx) of the intersection point 551 of the polysegment and the intersecting scan line. The process concludes whether IPx is to the right or left of the current pixel center, then TXx can be determined.

$$dx'=(dy'*dx)/dy$$

$$IPx=CPx+dx$$

Figure 25:
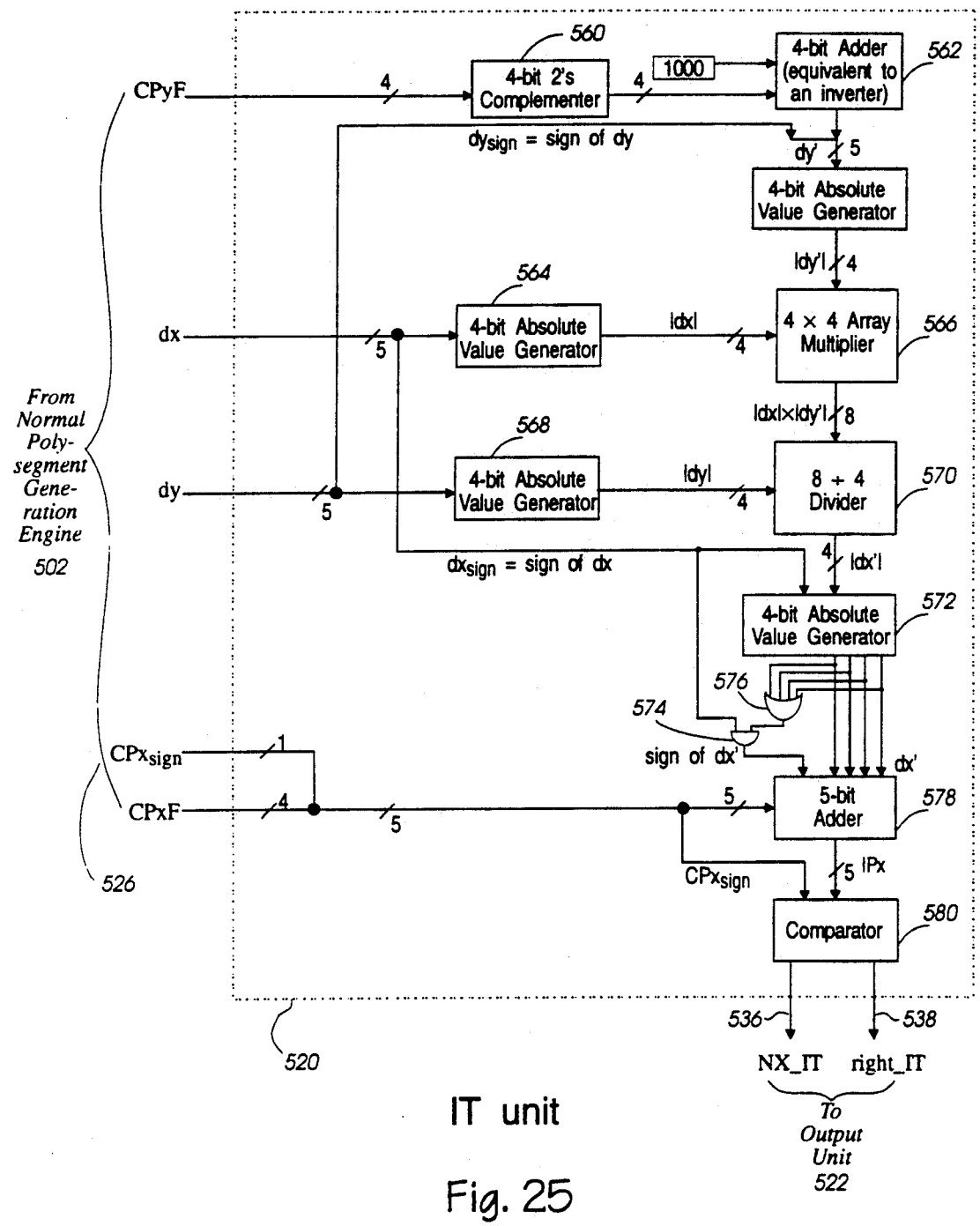
FIG. 25 shows the logical circuit design of IT unit.

FIG. 25 shows a block diagram of how the process is implemented. The IT unit 520 starts the computation of $dy'=IPy-CPy$. Two conditions are examined:

$$dy'_{sign} = dy_{sign} \text{ if } |dy'| > 0, \text{ and} \quad (1)$$

$$dy'_{sign} = 0 \text{ if } |dy'| = 0 \text{ (i.e., } dy' \text{ has the same sign bit as } dy). \quad (2)$$

IPy has a dy'$_{sign}$ fixed fractional value because IPy always locates at the pixel center level in terms of y coordinate value, so IPyF[3..0]=1000. Thus, the dy' value can be calculated by a 4-bit two's complementer 560 and a 4-bit adder 562.

Since (1) dx'$_{sign}$=dx$_{sign}$ if $|dx'|>0$ and (2) dx$_{sign}$=0 if $|dx'|=0$, dx' also always has the same sign bit as dx. During the process of calculating (dy' * dx) and [(dy' * dx) / dy), the sign bits can be neglected temporarily; after the absolute value is calculated, the sign bit of dx' can be recovered by assigning the dx sign bit to dx'. Thus, dx is converted to its absolute value $|dx|$ at 564, and a simple 4-by-4 array multiplier 566 can be used to calculate the value of $(|dy'| * |dx|)$. By applying the same technique, dy is converted to its absolute value $|dy|$ at 568, and a simple 8-by-4 divider 570 is used to calculate the $|dx'|$ absolute value. Finally, $|dx|$ is converted to dx' at 572 by incorporating the dx sign bit and converting to the right two's complement value. A two-input AND gate 574 and a four-input OR gate 576 is needed to set dx'$_{sign}$ to zero when $|dx|=0$.

A 5-bit binary adder 578 is used to determine the address of the transition pixel:

| | CPx$_{sign}$ | CPxF3 | CPxF2 | CPxF1 | CPxF0 |
|---|---|---|---|---|---|
| + | dx'$_{sign}$ | dx'3 | dx'2 | dx'1 | dx'0 |
| = | I$_{sign}$ | IPxF3 | IPxF2 | IPxF1 | IPxF0 |

The two output signals of comparator 580 are thus "right$_{13}$IT" equals to IPxF3, and "NX$_{13}$IT" equals to CPx$_{sign}$ eXclusive-OR I$_{sign}$. NX$_{13}$IT will be set to 1 if TXx is relative to NXx, 0 if TXx is relative CXx. The signal "right$_{13}$IT" will be set to 1 if TXx is the pixel immediately to the right of CX or NX, 0 if TX is CX or NX.

Figure 26:
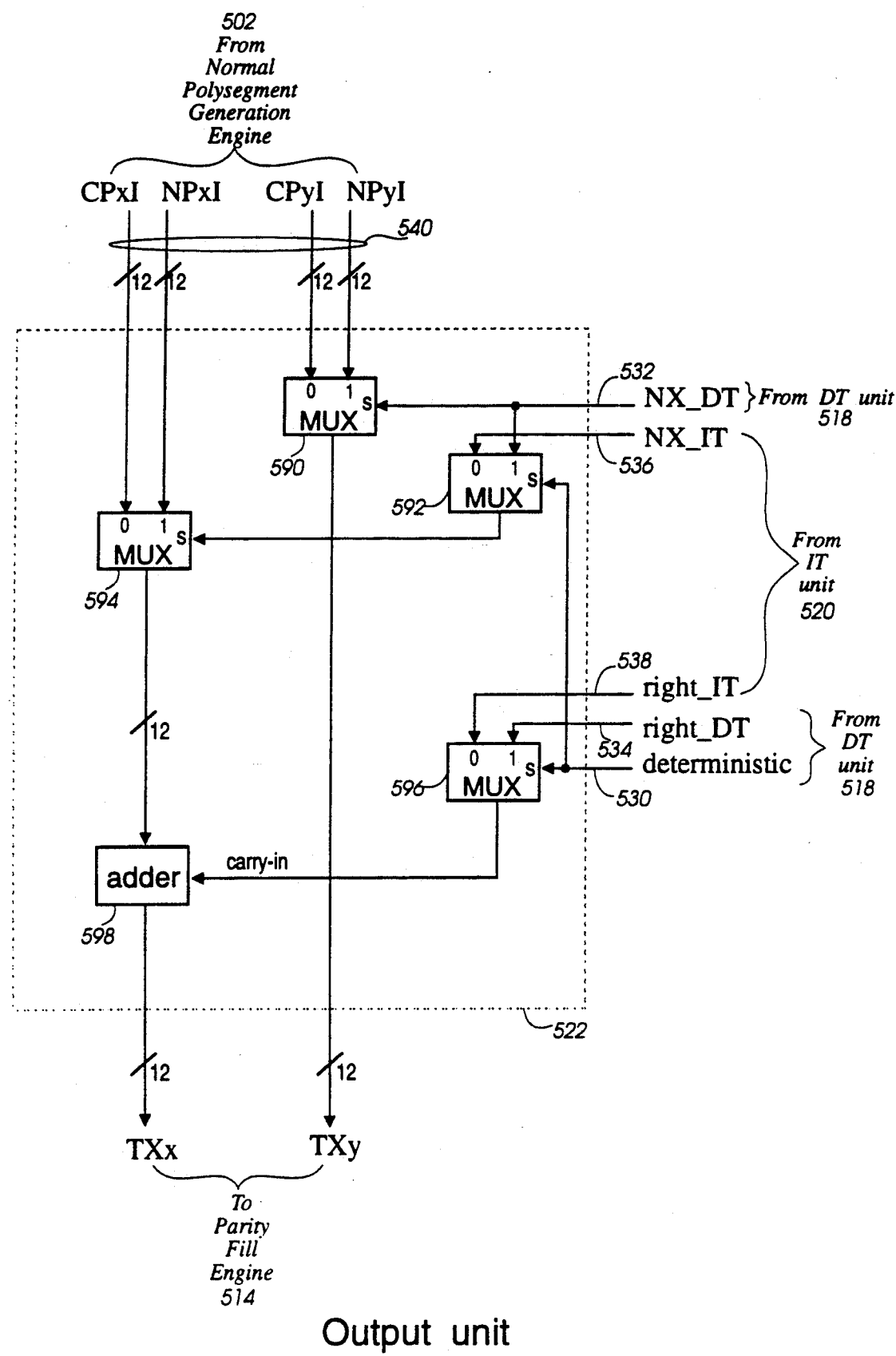
FIG. 26 is a block diagram illustrating the principal functional components of the Output Unit depicted in FIG. 21.

The output unit 522 is shown in FIG. 26 and includes the logic necessary to select the transition address TX in terms of CX or NX, using as input data on lines 540, the 12-bit integer terms CPxI, NPxI, CPyI and NPyI. If a scanline intersects a given polysegment, then the y coordinate of the transition pixel TXy is equal to either CXy or NXy, whereas the x coordinate of the transition pixel TXx is equal to CXx, CXx+1, NXx, or NXx+1. As indicated, TXy is determined solely by the input 532 from the DT unit (the NX$_{13}$DT signal). TXx can be determined by the DT unit via the inputs "NX$_{13}$DT" on line 532 and "right$_{13}$DT" on line 534 if the input "deterministic" on line 530 equals 1; otherwise TXx will be determined by the IT unit via the inputs "NX$_{13}$IT" on line 536 and "right$_{13}$IT" on line 538. Multiplexers 590-596 are used to select the appropriate input signals, and a 12-bit adder 598 adds the value of its input operand by 1 when TXx equals to CXx+1 or NXx+1.

After all the transition pixels of a graphic object are determined, interior filling can be achieved by parity filling engine 514 using the parity scan line filling method, i.e., writing black color to the pixels starting from the first transition pixel of a transition pixel pair, including the first transition pixel, and writing white color to the pixels starting from the second transition pixel of a transition pixel pair, including the second transition pixel.

Although the present invention has been described above in terms of an apparatus for speeding up the character generation process in a laser printer or display device, it will be understood by those skilled in the art that the present invention can also be implemented on other dot matrix devices,, such as plotters, typesetters, or other similar apparatus. It is therefore intended that the appended claims be interpreted to cover all alterations, modifications and applications that fall within the true spirit and scope of the invention.

What is claimed is:

1. Apparatus for converting image data in spline outline format into bit mapped data suitable for driving dot matrix devices, comprising:

normalized polysegment data generating means for converting spline data into normalized polysegment data representing straight lines, called polysegments, used to approximate the spline curves represented by said spline data, and having lengths equal to or less than the length of a diagonal dimension of a nominal pixel area of a pixel to be printed or displayed;

vertical scan conversion means responsive to said normalized polysegment data and operative to develop transition pixel data locating transition pixels corresponding to each intersection of a polysegment with a reference line passing through a particular point of each pixel in a row of pixels, a transition pixel being defined as a pixel having a predetermined positional relationship to a particular intersection; and parity scan filling means responsive to said transition pixel data and operative to generate bit mapped data corresponding thereto.

2. Apparatus as recited in claim 1 wherein said vertical scan conversion means includes decision transition logic means responsive to said normalized polysegment data and operative to develop first signals indicating for each polysegment whether or not a pixel transition can be identified, whether or not a corresponding pixel transition exists, and whether a pixel transition exists at the pixel in which a present polysegment endpoint resides or in a pixel adjacent thereto, or at the pixel in which the opposite polysegment endpoint resides or in a pixel adjacent thereto.

3. Apparatus as recited in claim 2 wherein said vertical scan conversion means further includes intersection transition computation means responsive to said normalized polysegment data and operative to computationally develop second signals indicating for each polysegment whether or not a corresponding pixel transition exists and, if so, whether it exists at the pixel in which a present polysegment endpoint resides or in a pixel adjacent thereto, or at the pixel in which the opposite polysegment endpoint resides or in a pixel adjacent thereto.

4. Apparatus as recited in claim 3 wherein said vertical scan conversion means further includes output means responsive to said normalized polysegment data, said first signals and said second signals, and operative to use said first signals to generate said transition pixel data if it indicates that said decision transition logic means can identify a pixel transition, but operative to use said second signals to generate said transition pixel data if said first signals indicate that said decision transition logic means can not identify a pixel transition.

5. A method of converting image data in spline outline format into bit mapped data suitable for driving dot matrix devices, comprising the steps of:

converting the spline data into normalized polysegment data representing straight lines, called polysegments, used to approximate the spline curves represented by said spline data, and having lengths equal to or less than the length of a diagonal dimension of a nominal pixel area of a pixel to be printed or displayed;

using said normalized polysegment data to develop transition pixel data locating transition pixels corresponding to each intersection of a polysegment with a reference line passing through a particular point of each pixel in a row of pixels, a transition pixel being defined as a pixel having a predetermined positional relationship to a particular intersection; and using said transition pixel data to generate bit mapped data corresponding thereto.

6. A method as recited in claim 5 wherein said step of using said normalized polysegment data includes developing first signals indicating for each polysegment whether or not a pixel transition can be identified, whether or not a corresponding pixel transition exists, and whether a pixel transition exists at the pixel in which a present polysegment endpoint resides or in a pixel adjacent thereto, or at the pixel in which the opposite polysegment endpoint resides or in a pixel adjacent thereto.

7. A method as recited in claim 6 wherein said step of using said normalized polysegment data further includes computationally developing second signals indicating for each polysegment whether or not a corresponding pixel transition exists and, if so, whether it exists at the pixel in which a present polysegment endpoint resides or in a pixel adjacent thereto, or at the pixel in which the opposite polysegment endpoint resides or in a pixel adjacent thereto.

8. A method as recited in claim 7 wherein said step of using said normalized polysegment data further includes using said first signals to generate said transition pixel data if it indicates that said decision transition logic means can identify a pixel transition, but operative to use said second signals to generate said transition pixel data if said first signals indicate that said decision transition logic means can not identify a pixel transition.

* * * * *